(12) United States Patent
Culpepper et al.

(10) Patent No.: US 10,253,506 B2
(45) Date of Patent: Apr. 9, 2019

(54) COMPOSITE INSULATING PANEL

(71) Applicant: Progressive Foam Technologies, Inc., Beach City, OH (US)

(72) Inventors: Patrick M. Culpepper, Canton, OH (US); Jason L. Culpepper, Beach City, OH (US)

(73) Assignee: PROGRESSIVE FOAM TECHNOLOGIES, INC., Beach City, OH (US)

( * ) Notice: Subject to any disclaimer, the term of this patent is extended or adjusted under 35 U.S.C. 154(b) by 0 days.

(21) Appl. No.: 15/435,760

(22) Filed: Feb. 17, 2017

(65) Prior Publication Data

US 2017/0234019 A1 Aug. 17, 2017

Related U.S. Application Data

(60) Provisional application No. 62/441,657, filed on Jan. 3, 2017, provisional application No. 62/370,895, filed
(Continued)

(51) Int. Cl.
*E04F 13/08* (2006.01)
*B32B 3/06* (2006.01)
(Continued)

(52) U.S. Cl.
CPC ............ *E04F 13/0875* (2013.01); *B32B 3/04* (2013.01); *B32B 3/06* (2013.01); *B32B 3/263* (2013.01); *B32B 3/28* (2013.01); *B32B 3/30* (2013.01); *B32B 5/18* (2013.01); *B32B 5/20* (2013.01); *B32B 7/045* (2013.01); *B32B 7/14* (2013.01); *B32B 13/045* (2013.01); *B32B 15/046* (2013.01); *B32B 15/18* (2013.01); *B32B 15/20* (2013.01); *B32B 21/047* (2013.01);
(Continued)

(58) Field of Classification Search
CPC ... E04F 13/0894; E04F 19/064; E04F 19/062; E04F 19/061; E04F 13/0875; E04F 13/0876; E04F 13/12; E04F 13/0801; E04F 13/0864; E04F 13/075; E04F 13/076; E04F 13/0878; E04D 3/362
See application file for complete search history.

(56) References Cited

U.S. PATENT DOCUMENTS 525,442 A * 9/1894 Burrows ............. E04F 13/0864
52/539
2,231,007 A 2/1941 Vane
(Continued)

FOREIGN PATENT DOCUMENTS

CA 2576987 A1 * 4/2005 .......... E04F 13/0864
CA 2534779 A1 * 8/2006 ............. E04C 2/296

*Primary Examiner* — Adriana Figueroa
*Assistant Examiner* — Jessie T Fonseca
(74) *Attorney, Agent, or Firm* — Fay Sharpe LLP

(57) ABSTRACT

An insulating siding panel comprises a backing member, and a siding member. The backing member comprises a front face, a rear face, a top face, and a bottom face. The siding member has an upper end, a lower end, and a nailing divot. An upper end of the backing member combines with the upper end of the siding member to form a tongue. A groove is defined in the bottom face of the backing member that is complementary in shape to the tongue. the nailing divot of the lower panel may be concealed by a front section of the backing member of the upper panel.

12 Claims, 33 Drawing Sheets

Related U.S. Application Data on Aug. 4, 2016, provisional application No. 62/296,465, filed on Feb. 17, 2016.

(51) Int. Cl.

| | |
|---|---|
| *B32B 3/26* | (2006.01) |
| *B32B 3/28* | (2006.01) |
| *B32B 3/30* | (2006.01) |
| *B32B 5/20* | (2006.01) |
| *B32B 27/06* | (2006.01) |
| *B32B 27/30* | (2006.01) |
| *E04B 1/70* | (2006.01) |
| *E04F 13/00* | (2006.01) |
| *B32B 5/18* | (2006.01) |
| *B32B 7/04* | (2019.01) |
| *B32B 7/14* | (2006.01) |
| *B32B 13/04* | (2006.01) |
| *B32B 15/04* | (2006.01) |
| *B32B 15/18* | (2006.01) |
| *B32B 15/20* | (2006.01) |
| *B32B 21/04* | (2006.01) |
| *B32B 27/28* | (2006.01) |
| *B32B 27/32* | (2006.01) |
| *B32B 27/34* | (2006.01) |
| *B32B 27/36* | (2006.01) |
| *B32B 27/42* | (2006.01) |
| *B32B 3/04* | (2006.01) |
| *E04C 2/00* | (2006.01) |

(52) U.S. Cl.
CPC .......... *B32B 27/065* (2013.01); *B32B 27/286* (2013.01); *B32B 27/30* (2013.01); *B32B 27/302* (2013.01); *B32B 27/304* (2013.01); *B32B 27/306* (2013.01); *B32B 27/32* (2013.01); *B32B 27/34* (2013.01); *B32B 27/36* (2013.01); *B32B 27/365* (2013.01); *B32B 27/42* (2013.01); *E04B 1/7076* (2013.01); *E04F 13/007* (2013.01); *E04F 13/0864* (2013.01); *E04F 13/0878* (2013.01); *B32B 2250/02* (2013.01); *B32B 2250/246* (2013.01); *B32B 2250/44* (2013.01); *B32B 2266/025* (2013.01); *B32B 2266/0228* (2013.01); *B32B 2266/0278* (2013.01); *B32B 2266/08* (2013.01); *B32B 2307/304* (2013.01); *B32B 2307/712* (2013.01); *B32B 2307/732* (2013.01); *B32B 2307/734* (2013.01); *B32B 2607/00* (2013.01); *E04C 2002/001* (2013.01); *E04F 13/0801* (2013.01); *E04F 13/0866* (2013.01); *E04F 13/0869* (2013.01); *E04F 13/0894* (2013.01)

(56) References Cited

U.S. PATENT DOCUMENTS

| | | | |
|---|---|---|---|
| 2,400,357 A * | 5/1946 | Krajci | E04D 1/28 52/539 |
| 3,535,844 A | 10/1970 | Glaros | |
| 4,788,808 A | 12/1988 | Slocum | |
| 4,955,169 A * | 9/1990 | Shisko | E04F 13/0864 52/536 |
| 8,850,772 B1 | 10/2014 | Stanfill | |
| 2006/0042183 A1 | 3/2006 | Benes | |
| 2006/0053715 A1 | 3/2006 | Mowery | |
| 2007/0193177 A1 * | 8/2007 | Wilson | E04F 13/0864 52/518 |
| 2010/0064611 A1 | 3/2010 | Holt | |
| 2010/0281801 A1 * | 11/2010 | Shaw | B32B 5/18 52/302.1 |
| 2011/0214372 A1 * | 9/2011 | Mullet | E04F 13/075 52/309.4 |
| 2013/0199121 A1 * | 8/2013 | Grau | E04C 2/30 52/588.1 |
| 2017/0234019 A1 | 8/2017 | Culpepper | |

* cited by examiner

COMPOSITE INSULATING PANEL

CROSS-REFERENCE TO RELATED APPLICATIONS

This application claims priority to U.S. Provisional Patent Application Ser. No. 62/441,657, filed on Jan. 3, 2017; and to U.S. Provisional Patent Application Ser. No. 62/370,895, filed on Aug. 4, 2016; and to U.S. Provisional Patent Application Ser. No. 62/296,465, filed on Feb. 17, 2016. These applications are each fully incorporated by reference herein.

BACKGROUND

The present disclosure relates to composite insulated siding panels for use on the exterior of a building, such as a house. Methods and processes for making and/or using such composite insulated siding panels are also disclosed.

In a building structure, such as a house, a frame is typically built. An exterior wall of plywood or material of similar function is then placed upon the frame to provide an exterior surface. A weatherproofing layer may cover the exterior wall. An insulation layer can then be placed, and finally a cladding, paneling, sheathing, veneer, or siding is placed to provide the final exterior view.

Vinyl siding is a popular substitute for wood paneling and aluminum siding. It is easily cleaned, and it is resistant to deterioration. It may also be easily installed around windows and doors. Moreover, it may be produced in a variety of shapes and colors by known extrusion and molding processes at a relatively low cost per sheet or panel.

To enhance the thermal insulation of building structures, one or more layers of insulating material can be placed between the vinyl siding and the exterior wall of the building. For example, a layer of insulation can be placed on an exterior wall, and the vinyl siding then installed over the insulating layer. In other insulated siding systems, an insulated panel is generally attached to a veneer, such as a vinyl siding panel.

It would be desirable to produce additional insulated siding panel systems or assemblies that allow for simple production and easy installation and greater insulating properties.

BRIEF DESCRIPTION

The present application discloses, in various exemplary embodiments, composite insulating panels for use on the exterior surfaces or walls of a building. The composite insulating panels include a backing member which is generally attached to a facing or siding member. In particular embodiments, the backing member is very thin, yet still able to provide the requisite strength. The backing member may have a maximum thickness (depth) at its base of about 0.80 inches or less, including about 0.75 inches. In other embodiments, the backing member may have a maximum thickness at its base of about 1.500 inches or less, including about 1.250 inches. The backing member may be composed of a rigid foam insulation, which provides strength, enables a wide variety of design options, and provides increased R-values. The facing or siding member also provides some strength and insulating properties, but also provides the external ornamental characteristics of the composite insulating panel.

Disclosed herein in various embodiments are composite insulating panels, comprising a backing member and a siding member. The backing member includes a front face, a rear face, a top face, and a bottom face comprising a front section and a rear section, wherein a groove is defined in the bottom face between the front section and the rear section. The siding member includes a tongue at an upper end, a veneer, a lower end including a bottom lip, and a nailing divot located proximate the upper end. At least a substantial portion of a perimeter of the front face of the backing member is bonded to the rear face of the siding member. The tongue is adapted to engage in a groove of a backing member of an associated adjacent composite insulating panel.

In some particular embodiments, the nailing divot is formed of at least two layers of different materials.

The siding member may further comprise a top lip extending rearward from above the nailing divot, the top lip being located adjacent the top face of the backing member.

In some embodiments, an angle J may be present between the tongue and a plane which is parallel to the rear face of the backing member, and the angle J is greater than 0°.

The tongue can terminate in a bulbous tip or a rollover end. The composite insulating panel may pass ASTM D3679 surface distortion standards when tested at 170° F.

Also disclosed are insulated siding systems comprising a first composite panel and a second composite panel. The first composite panel and the second composite panel both comprise: a backing member including a front face, a rear face, a top face, and a bottom face comprising a front section and a rear section, wherein a groove is defined in the bottom face between the front section and the rear section; and a siding member including a tongue at an upper end, a front veneer, a rear face, a lower end including a bottom lip, and a nailing divot located proximate the upper end; wherein at least a substantial portion of a perimeter of the front face of the backing member is bonded to the rear face of the siding member; and wherein the tongue of the first composite panel engages the groove of the second composite panel. The resulting system may (a) reduce back-to-front air movement through the system by at least 40%, or (b) have a windload resistance of at least 60 lbs per square inch when tested according to ASTM D5206 with the backing members having a thickness of 1.25 inches or less.

Also disclosed herein are composite insulating panels that comprise a backing member and a siding member. The backing member includes a front face, a rear face, a top face, and a bottom face comprising a front section and a rear section, wherein a groove is defined in the bottom face between the front section and the rear section. The siding member includes an upper end, a tongue, a lower end including a bottom lip, and a nailing divot located between the upper end and the lower end. The siding member also includes a front face and a rear face, the rear face of the siding member being attached to the front face of the backing member. The bottom lip extends rearward from the lower end of the siding member and is located adjacent to the front section of the bottom face of the backing member. The tongue is adapted to engage in a groove of a backing member of an associated adjacent composite insulating panel.

The backing member front face may include a recessed area located adjacent the backing member top face. The front face of the backing member may form an acute angle in relation to the front section of the bottom face of the backing member.

Usually, the front section of the bottom face of the backing member extends downward beyond the rear section of the bottom face of the backing member.

The groove defined in the bottom face between the front and rear sections thereof may include generally parallel front and rear walls. Alternatively, the groove defined in the bottom face between the front and rear sections may include front and rear walls which diverge from each other.

The nailing divot may be spaced from a top edge of the siding member such that an upper strip is defined in the siding member between the nailing divot and the top edge of the siding member.

The siding member can further comprise a top lip extending rearward from above the nailing divot, the top lip being located adjacent the top face of the backing member.

The siding member may further comprise a groove lining section extending from a free edge of the bottom lip. Sometimes, the groove lining section comprises a forward face portion extending generally perpendicular to the bottom lip and a rearward face portion extending at an acute angle in relation to the forward face portion. In other embodiments, the groove lining section comprises a forward face portion extending generally perpendicular to the bottom lip and a rearward face portion comprising a front section extending at an acute angle in relation to the forward face portion and a rear section extending generally parallel to the forward face portion.

The siding member can further comprise a flange which extends from a free edge of and is oriented generally perpendicular to the bottom lip. The tongue may terminate in a bulbous tip or a rollover end.

Also disclosed are other embodiments of composite insulating panels that comprise a backing member and a siding member. The backing member includes a front face, a rear face, a top face, and a bottom face comprising a front section and a rear section, wherein a groove is defined in the bottom face between the front and rear sections. The siding member includes an upper end, a lower end including a bottom lip, and a nailing divot located proximate the upper end. The siding member also includes a front face and a rear face, the rear face of the siding member being attached to the front face of the backing member. The bottom lip extends rearward from the lower end of the siding member and is located adjacent to the front section of the bottom face of the backing member. In these embodiments, a tongue is defined in combination by the upper end of the siding member and the upper end of the backing member, the tongue being adapted to engage in a groove of a backing member of an associated adjacent composite insulating panel.

The front section of the bottom face of the backing member may extend downward beyond the rear section of the backing member. The groove defined in the bottom face between the front and rear sections may include front and rear walls which diverge from each other.

The nailing divot may be spaced from a top edge of the siding member such that an upper strip is defined in the siding member between the nailing divot and the top edge of the siding member.

The siding member may further comprise a groove lining section extending from a free edge of the bottom lip. Sometimes, the groove lining section comprises a forward face portion extending generally perpendicular to the bottom lip and a rearward face portion extending at an acute angle in relation to the forward face portion. In other embodiments, the groove lining section comprises a forward face portion extending generally perpendicular to the bottom lip and a rearward face portion comprising a front section extending at an acute angle in relation to the forward face portion and a rear section extending generally parallel to the forward face portion.

The siding member may further comprise a flange which extends from a free edge of and is oriented generally perpendicular to the bottom lip.

In some embodiments, the rear face of the groove forms an acute angle with the rear face of the backing member; and the front face of the backing member forms an acute angle with the top face of the backing member; and the top edge of the siding member aligns with a top edge of the front face of the backing member.

In particular embodiments, the backing member has a first thickness measured as a distance between the rear face of the backing member and the front face of the backing member at the nailing divot, and a second thickness measured as a distance between the rear face of the backing member and the front face of the backing member at a closed end of the groove; and the second thickness is greater than the first thickness. The ratio of the first thickness to the second thickness of the backing member can be from about 0.25:1 to about 0.75:1.

Also generally disclosed herein in various embodiments are composite insulating panel comprising a backing member and a siding member. The backing member has a front face, a rear face, a top face, and a bottom face, wherein a groove is defined in the bottom face of the backing member, the groove having at least a front face and a rear face. The siding member has a veneer, a top edge, a bottom lip, and a nailing divot located between the veneer and the top edge. The front face of the backing member is attached to the rear face of the siding member. The bottom lip extends rearward from a bottom edge of the veneer and is adjacent to a portion of the bottom face of the backing member. A tongue is formed from at least a portion of the siding member, the tongue being complementary to the groove.

In some embodiments, the front face of the backing member is angled with respect to the rear face of the backing member. In other embodiments, the groove of the backing member has a height that is equal to or greater than a height of the tongue.

Sometimes, an angle A between the tongue and the top face of the backing member is from about 60° to about 90°.

In particular embodiments, an angle G between the tongue and a plane parallel to the rear face of the backing member is greater than 0°, or greater than 5°.

In particular embodiments, the backing member has a top thickness of from about 0.2 inches to about 0.5 inches; and the backing member has a bottom thickness of about 0.5 inches to about 1 inch. In other embodiments, the backing member has a top thickness of from about 0.9 inches to about 1.2 inches; and the backing member has a bottom thickness of about 1.4 inches to about 1.8 inches.

The nailing divot may be recessed relative to the front face of the veneer. The front face of the backing member may form an acute angle with the bottom face of the backing member.

In some embodiments, the bottom face of the backing member has a front section and a rear section. The front section is located between the groove and the front face of the backing member, and the rear section is located between the groove and the rear face of the backing member. The front section of the backing member may extend downward beyond the rear section.

The veneer may have a constant thickness measured from the front face to the rear face. The nailing divot can define the top edge of the siding member.

In some embodiments, the siding member further comprises an upper strip between the nailing divot and the top edge of the siding member.

In particular embodiments, the top edge of the siding member has a curved surface. This curved surface can be provided, for example, by a spherical bulb, or by bending the top of the siding member over.

In various embodiments, the rear face of the backing member and the rear face of the groove are connected by a rear bottom face; and the tongue is formed from only the upper strip of the siding member. In more particular embodiments, the siding member has a top wall extending rearward from above the nailing divot adjacent the top face of the backing member.

Sometimes, in embodiments having an upper strip, a projection extends upward from the top face of the backing member. A front face of the projection is aligned with the front face of the backing member. In these embodiments, the tongue of the composite insulating panel is formed from the projection of the backing member and the upper strip.

In particular embodiments, the rear face of the groove forms an acute angle with the rear face of the backing member; and the front face of the backing member forms an acute angle with the top face of the backing member; and the top edge of the siding member aligns with a top front edge of the backing member. The tongue is formed from (i) a portion of the siding member that includes the top edge of the siding member, and (ii) a portion of the backing member. In some such embodiments, the siding member further comprises a groove lining, the groove lining having a forward face and a rearward face, the forward face being adjacent to the front face of the groove, and the rearward face being adjacent to the rear face of the groove.

In some more specific embodiments, the backing member has an insulation thickness and a front section thickness, wherein the insulation thickness is the distance between the rear face of the backing member and the front face of the backing member at the nailing divot, and the front section thickness is the distance from the front face of the groove to the front face of the backing member as measured at the bottom face of the backing member; and the insulation thickness is greater than the front section thickness.

In many embodiments, the groove has an upper face that connects the front face of the groove to the rear face of the groove, the upper face forms an acute angle with the forward face, and the upper face forms an obtuse angle with the rearward face.

In some embodiments, the siding member further comprises a groove lining, the groove lining having a forward face, a rearward face, and an upper side; a bottom edge of the forward face is connected to a rearward edge of the bottom lip; and the forward face is adjacent to the front face of the groove, the rearward face is adjacent to the rear face of the groove, and the upper side is adjacent to the upper face of the groove.

In other embodiments, the siding member further comprises a ledge that is connected to the bottom lip and adjacent to the front face of the groove.

The rear face of the backing member can further comprise a drainage system.

The composite insulating panels of the present disclosure have many advantages. For example, the overall height of the composite siding panel facilitates the use of standard trim accessories. The nailing divot of the siding member provides a quick and easy way to attach the siding member to an exterior surface or wall of a building and improves rigidity and handling. Further yet, the rear face of the backing member may have a drainage system from a series of vertical grooves, which facilitates the drainage of moisture and condensate between the backing member and the exterior surface or wall of the building. The tongue and groove of the siding panel allow vertically-adjacent panels to be installed in a way that maximizes coverage of the backing member behind the siding member and reduces the amount of the exterior surface or wall of the building that is uncovered by the backing member.

These and other non-limiting characteristics of the disclosure are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
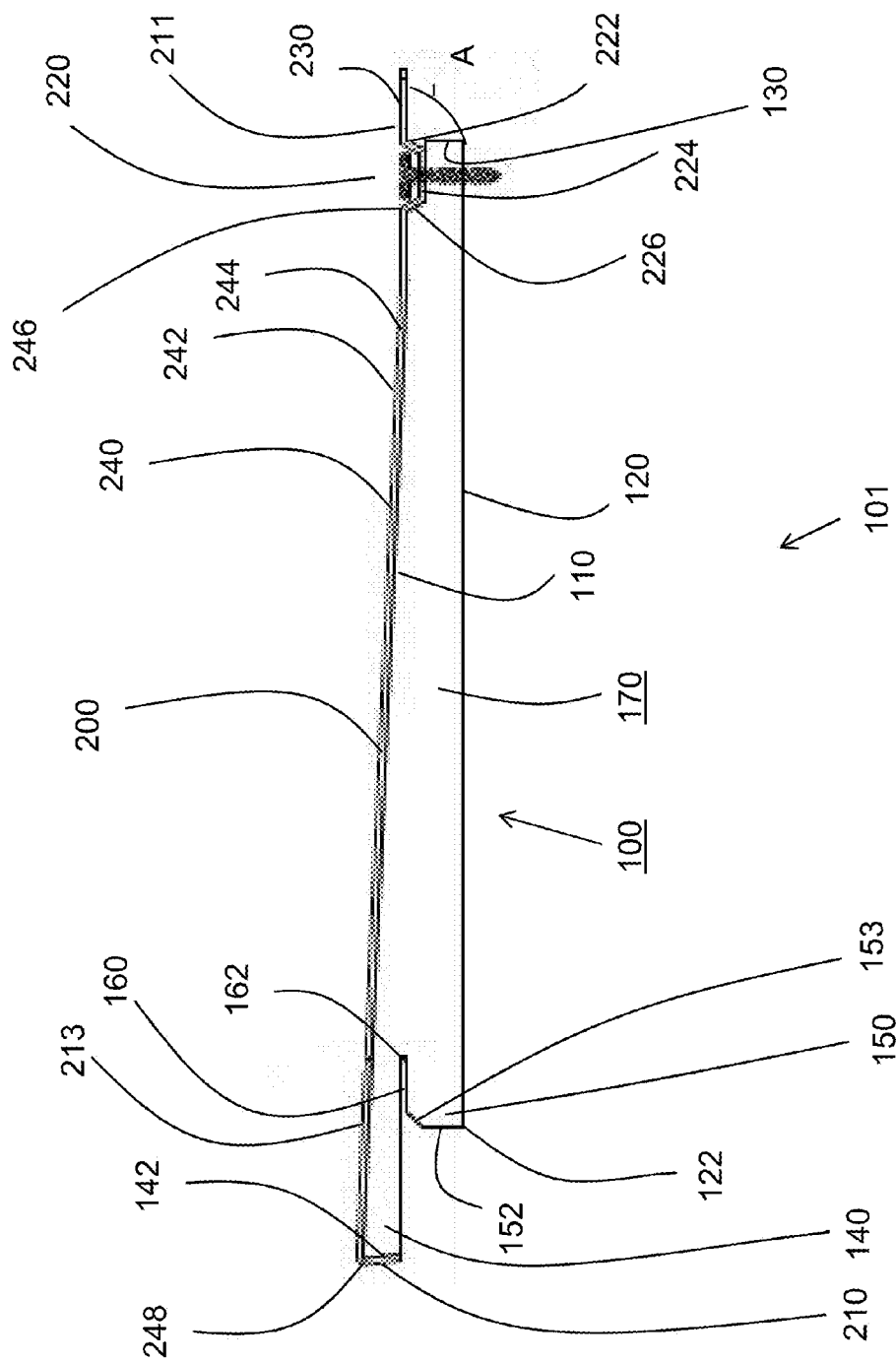
FIG. 1 is a side view of a first exemplary embodiment of an insulating panel of the present disclosure.

A more complete understanding of the components and apparatus disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification, various devices and parts may be described as "comprising" other components. The terms "comprise(s)," "include(s)," "having," "has," "can," "contain(s)," and variants thereof, as used herein, are intended to be open-ended transitional phrases, terms, or words that do not preclude the possibility of additional components. However, such description should be construed as also describing the devices and parts as "consisting of" and "consisting essentially of" the enumerated components, and excluding other components.

Numerical values should be understood to include numerical values which are the same when reduced to the same number of significant figures and numerical values which differ from the stated value by less than the experimental error of the conventional measurement technique used to determine the value.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" should also be considered as disclosing the range defined by the absolute values of the two endpoints. For example, the expression "from about 2 to about 4" also discloses the range "from 2 to 4."

Some of the terms used herein are relative terms. For example, the terms "front" and "rear" and "forward" and "rearward" are relative to a center, with the front being located opposite to the rear and an element that extends "forward" always extending away from the center in a direction opposite an element that extends "rearward." The terms "top" and "bottom" and "upward" and "downward" are relative to an absolute reference, i.e. the surface of the earth. Put another way, a top location is always located at a higher elevation than a bottom location and an element that extends "upward" always extends away from the surface of the earth, whereas an element that extends "downward" extends toward the surface of the earth. The term "horizontal" indicates a direction that is parallel with the surface of the earth, and the term "vertical" indicates a direction that is normal to the horizontal direction. As used herein, the front and rear are located along an x-axis, the left and right are located along a y-axis, and the top and bottom are located along a z-axis, wherein the three axes are perpendicular to each other.

The terms "plane" and "planar" should be construed in a layman's manner to refer generally to a common level, and not strictly in mathematical terms.

The term "parallel" should be construed in a layman's manner as two edges or faces generally continuously having the same distance between them, and should not be strictly construed in mathematical terms as requiring that the two edges or faces cannot intersect when extended for an infinite distance. Similarly, the term "perpendicular" should not be construed as requiring that two faces meet at an angle of absolutely 90°.

The term "about", as used herein refers to a variance of plus/minus 5% (±5%) when used in conjunction with a numerical value.

The present disclosure relates to an insulating panel formed from a foam backing member and a siding member, joined together to form what might also be considered a composite insulating panel. Generally, the composite insulating panel comprises a siding member, a backing member, and a tongue. A groove that is complementary in shape to the tongue is present in a bottom face of the backing member. The tongue is formed from at least a portion of the siding member, and may also include a portion of the backing member.

Figure 2:
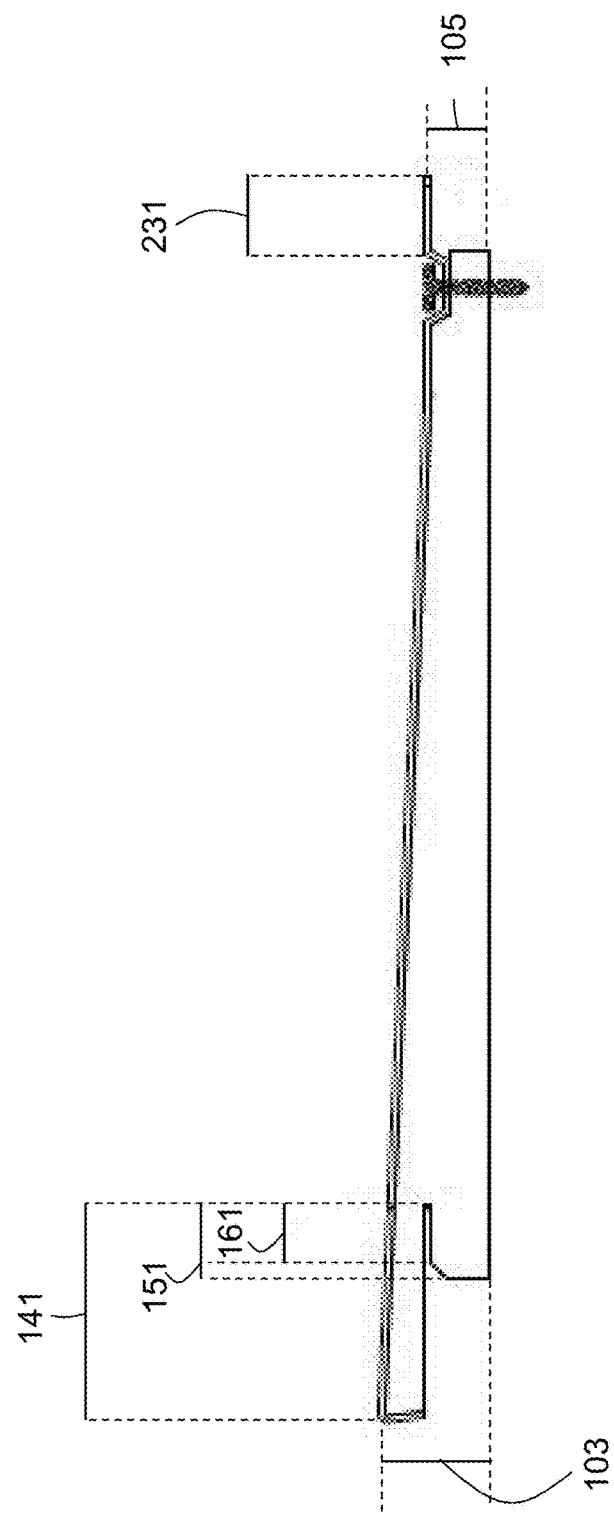
FIG. 2 is a side view of the insulating panel of FIG. 1 including additional measurements.
Figure 3:
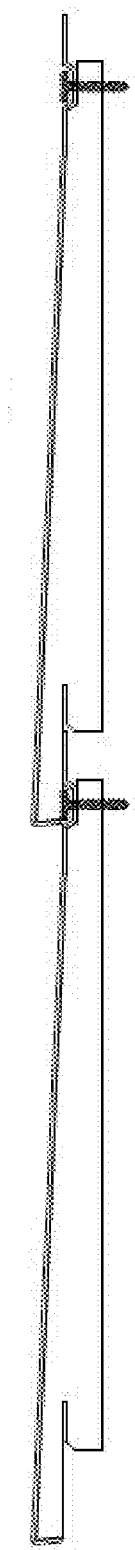
FIG. 3 is a side view showing two insulating panels of FIG. 1 adjacent to each other.
Figure 4:
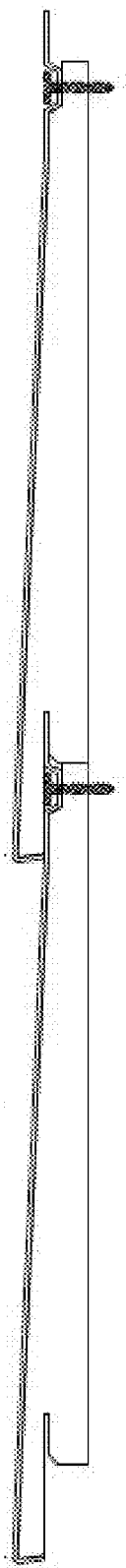
FIG. 4 is a side view showing two insulating panels of FIG. 1 joined together, one upon the other. The tongue of the lower panel is inserted into the groove of the upper panel, and a continuous foam layer is created along the rear faces of the backing members.

FIGS. 1-4 are various views of a first exemplary embodiment of the composite insulating panel. FIG. 1 is a side view. FIG. 2 is a side view showing additional measurements. FIG. 3 is a side view showing two panels being joined vertically, and FIG. 4 shows the two panels joined together.

Referring first to FIG. 1, the composite insulating panel 101 comprises a backing member 100 and a siding member 200. The insulating panel also includes a tongue and a groove, which are used to join adjacent panels together vertically.

The backing member 100 has a front face 110, a rear face 120, a top face 130, a bottom face, a first side face 170, and a second side face (not visible). In this embodiment, the backing member is separated into a front section 140 and a rear section 150 along the bottom face. Put another way, the bottom face is in two parts here, with the front section 140 having a front bottom face 142 and the rear section 150 having a rear bottom face 152. The front face 110 is located opposite the rear face 120. The top face 130 is located opposite the bottom face 142/152. The first side face 170 is located opposite the second side face (not visible). The front face 110, the rear face 120, the top face 130, and the bottom face are each substantially flat. As illustrated here, the top face 130 is substantially parallel to the rear bottom face 152 of the backing member. It should be noted, though, that there is no requirement for the top face 130 to be flat, or for a defined edge between the top face 130 and the rear face 120. For example, the top face 130 could be curved.

As illustrated here, the front face 110 of the backing member 100 is angled with respect to the rear face 120 of the backing member 100. Put another way, the backing member does not have a constant thickness between the front face 110 and the rear face 120 as one moves upward from the bottom face to the top face 130. This is better illustrated in FIG. 2. The backing member has a top thickness 105 measured along the top face, and has a bottom thickness 103 measured along the bottom face. As seen here, the top thickness 105 is less than the bottom thickness 103. In some embodiments, the backing member has a top thickness of from about 0.2 inches to about 0.5 inches; and the backing member has a bottom thickness of about 0.5 inches to about 1 inch. In other embodiments, to be described further herein, the backing member has a top thickness of from about 0.9 inches to about 1.2 inches; and the backing member has a bottom thickness of about 1.4 inches to about 1.8 inches.

Referring back to FIG. 1, a groove 160 is present in the bottom face of the backing member between the front bottom face 142 and the rear bottom face 152. The groove includes an interior bottom face 162, which can also be referred to as an upper face of the groove. An angled face 153 leads from the rear bottom face 152 to the groove 160. The front section 140 can also be described as being located between the groove 160 and the front face 110 of the backing member. The rear section 150 can also be described as being located between the groove 160 and the rear face 120 of the backing member.

The size/shape of the front section 140 and the rear section 150 may also be described in terms of the groove, with the front bottom face 142 being further from the interior bottom face 162 than the rear bottom face 152. This aspect can be seen in FIG. 2. The distance between the interior bottom face and the front bottom face is indicated as length 141. The distance between the interior bottom face and the rear bottom face is indicated as length 151. The distance between the interior bottom face and the angled face is indicated as length 161; this distance can also be considered the height of the groove. Alternatively, the bottom edge 122 of the rear face of the backing member can be described as having a horizontal detent (i.e. the empty space below the rear bottom face 152 that runs from the first side to the second side of the backing member. Put yet another way, the front section 140 extends downward beyond the rear section 150. As a result, the front section 140 will cover the nailing divot of a panel located below it, as best seen in FIG. 4.

Next, the siding member 200 is formed from a veneer 240, an upper strip 230, and a nailing divot 220. The siding member has a rear face 244, an upper end 211, and a lower end 213. The nailing divot 220 is located proximate the upper end. Here, the nailing divot is located between the veneer 240 and the upper strip 230. The veneer 240 has a front face 242, a top edge 246, and a bottom edge 248. As illustrated in FIG. 1, the veneer 240 is relatively flat, although many versions have a slight radius in the face (i.e. an indent into the backing member) to make it easier to form the siding member during an extrusion process. The radius is usually not more than a 29-inch radius, and not less than a 100-inch radius, in a 6-inch profile. The veneer has a constant thickness between the front face 242 and the rear face 244 from the top edge 246 to the bottom edge 248. The front face 110 of the backing member 100 is attached to the rear face 244 of the siding member 200. Note that here, the front face 110 is not attached to the upper strip 230 of the siding member. Put another way, the rear face 244 is made up of the rear of the veneer and the nailing divot, but not the rear of the upper strip. A bottom lip 210 extends backward from the bottom edge 248 of the veneer. The bottom lip is adjacent to the front bottom face 142, i.e. the front section of the bottom face.

As seen in FIG. 1, the nailing divot 220 is made up of a nailing wall 224, an upper wall 222, and a bottom wall 226. The nailing wall 224 contains apertures or openings (not visible) through which fasteners (such as screws or nails) can be driven to attach the composite panel to an exterior wall. The upper wall 222 and the bottom wall 226 are angled such that the nailing wall 224 is recessed relative to the front face 242 of the veneer 240. The nailing divot 220 is adjacent the top face 130 of the backing member 100. The bottom wall 226 of the nailing divot connects to the veneer 240, and the upper wall 222 of the nailing divot connects to the upper strip 230. The veneer 240 and the upper strip 230 are substantially co-planar.

Referring now to FIG. 2, the groove 160 of the backing member has a height 161 that is equal to or greater than a height 231 of the upper strip 230. As seen in FIG. 4, the upper strip 230 and the groove 160 are complementary in shape, with the upper strip fitting snugly into the groove 160. In this particular embodiment, the tongue of the composite panel is formed from only the upper strip 230 of the siding member 200. The upper strip 230 extends beyond the top face 130 of the backing member. The angle A between the upper strip 230 and the top face 130 of the backing member is from about 60° to about 90°.

FIG. 3 illustrates two composite siding panels placed in vertical relationship to each other prior to being joined/connected. FIG. 4 shows the two vertically-aligned panels joined together. The front section 140 covers the nailing divot 220, so that the nailing divot is not visible from the front.

Figure 5:
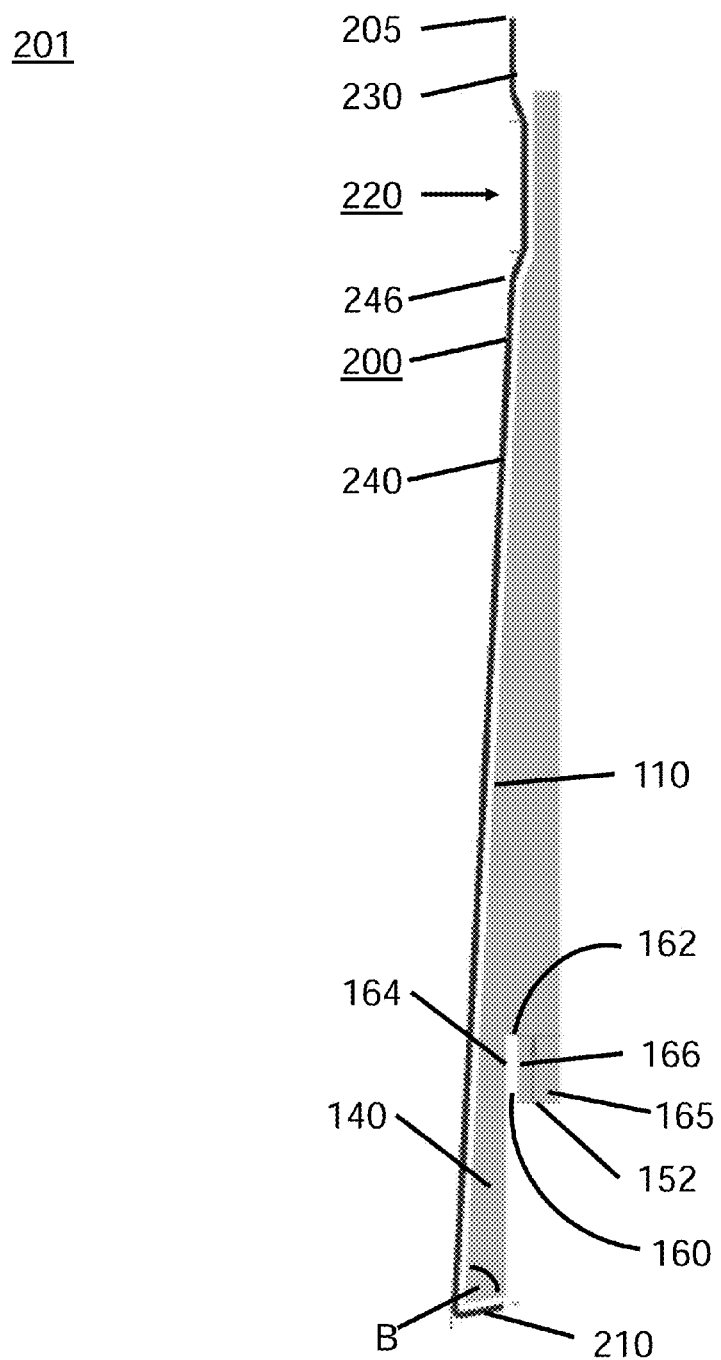
FIG. 5 is a side view of a second exemplary embodiment of an insulating panel of the present disclosure and somewhat similar to that of FIG. 1.
Figure 6:
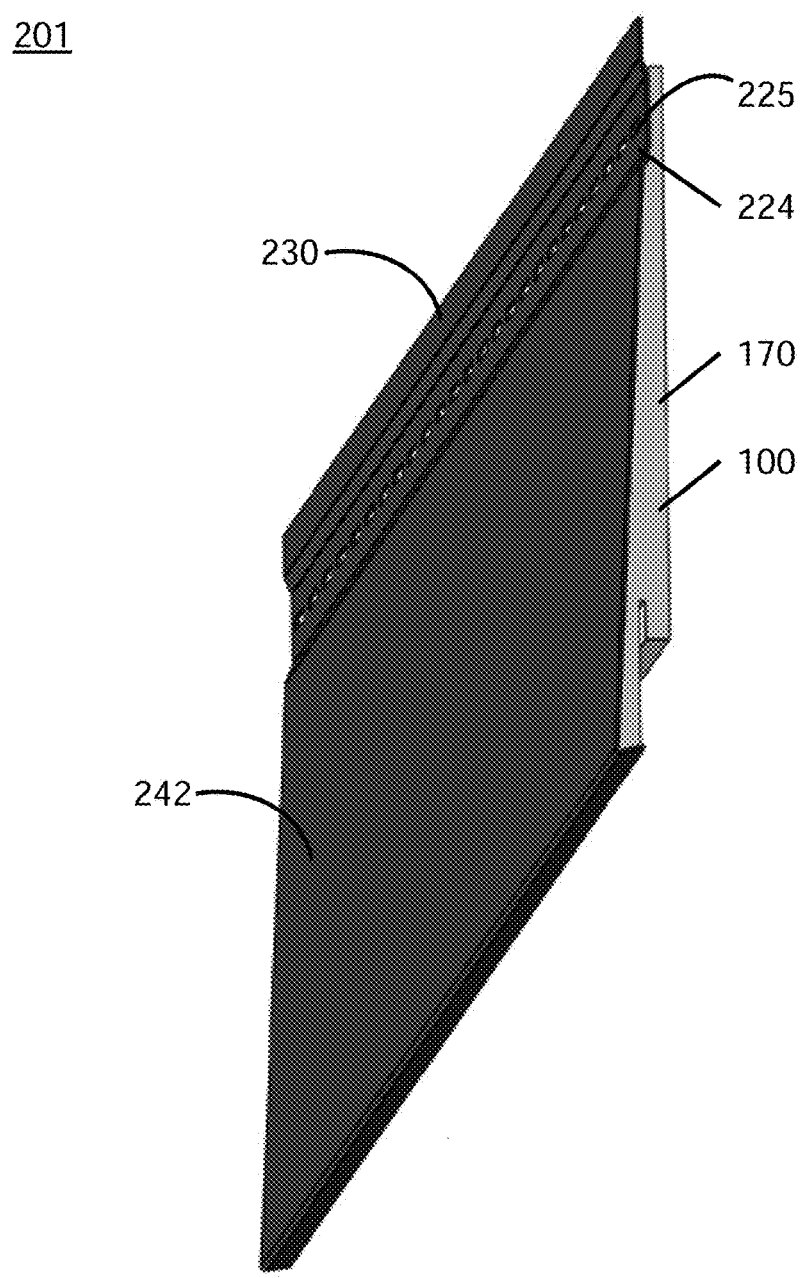
FIG. 6 is a perspective view of the insulating panel of FIG. 5.
Figure 7:
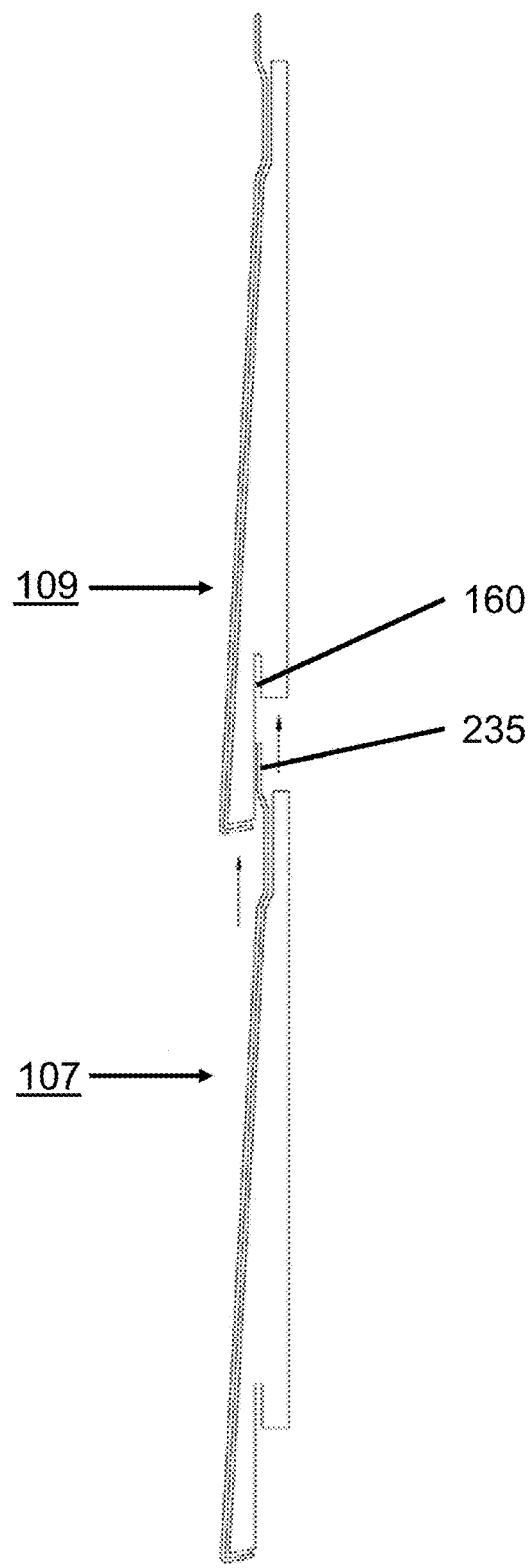
FIG. 7 is a side view showing how two insulating panels of FIG. 5 are joined to each other vertically.

FIGS. 5-7 are various views of a second exemplary embodiment of the composite insulating panel. FIG. 5 is a side view. FIG. 6 is a perspective view. FIG. 7 is a side view showing two panels vertically aligned with each other, but not yet joined together.

The composite siding panel 201 of FIG. 5 is very similar to the panel of FIG. 1. One difference between FIG. 1 and FIG. 5 is that in FIG. 5, the nailing divot 220 is shallower, or in other words is not recessed to the same extent as that seen in FIG. 1. Another difference is that no angled face 153 is present in the panel of FIG. 5 between the rear bottom face 152 and the groove 160.

Some additional aspects of the composite panel are further illustrated here. The groove 160 includes a front face or front wall 164, a rear face or rear wall 166, and an upper face or upper wall 162. The front face 164 is present along the front section 140, and the rear face 166 is present along the rear section 150. The upper face 162 connects the front face 164 to the rear face 166. As illustrated here, the groove has a rectangular cross-section when viewed from the side, with a substantially right angle between the front face and the upper face, and a substantially right angle between the upper face and the rear face. Put another way, the front wall 164 and the rear wall 166 are generally parallel to each other. In addition, the front face 110 of the backing member forms an acute angle B with the front bottom face 142 of the backing member.

Next, the siding member 200 can be more generally described as having a veneer 240, a bottom lip 210, a top edge 205, and a nailing divot 220 located between the veneer 240 and the top edge 205. The top edge 205 of the siding member is different from the top edge 246 of the veneer. The top edge 205 of the siding member could also be referred to as the uppermost edge of the siding member. Here, the top edge 205 is a distal edge of the upper strip 230. The upper strip 230 can also be described as being located between the nailing divot 220 and the top edge 205.

Referring now to FIG. 6, the apertures 225 in the nailing wall 224 of the nailing divot are visible. The front face 242 of the veneer is also shown, as is the upper strip 230. The first side face 170 of the backing member 100 is also visible.

The apertures 225 in the nailing divot can have any shape, such as the shape of a circle, ellipse, rectangle, or square. The apertures are arranged such that a portion of the backing member 100 is behind the apertures, so that the fasteners (such as nails, screws, etc.) are driven through both the nailing divot and the backing member during installation. As previously noted, the nailing divot may be recessed relative to the front face of the veneer. This aids in placing a second composite panel over the nailing divot of a first panel without the fasteners gouging the backing member of the second composite panel during installation.

FIG. 7 illustrates how the upper strip of a lower panel 107 acts as a tongue 235 and is inserted into the groove 160 of a upper panel 109. Again, the tongue 235 and the groove 160 of the siding panel are generally complementary in shape, and engage each other to lock the two panels 107, 109 together. In this way, multiple insulating panels may be installed adjacent one another, with one insulating panel located above another insulating panel.

Figure 8:
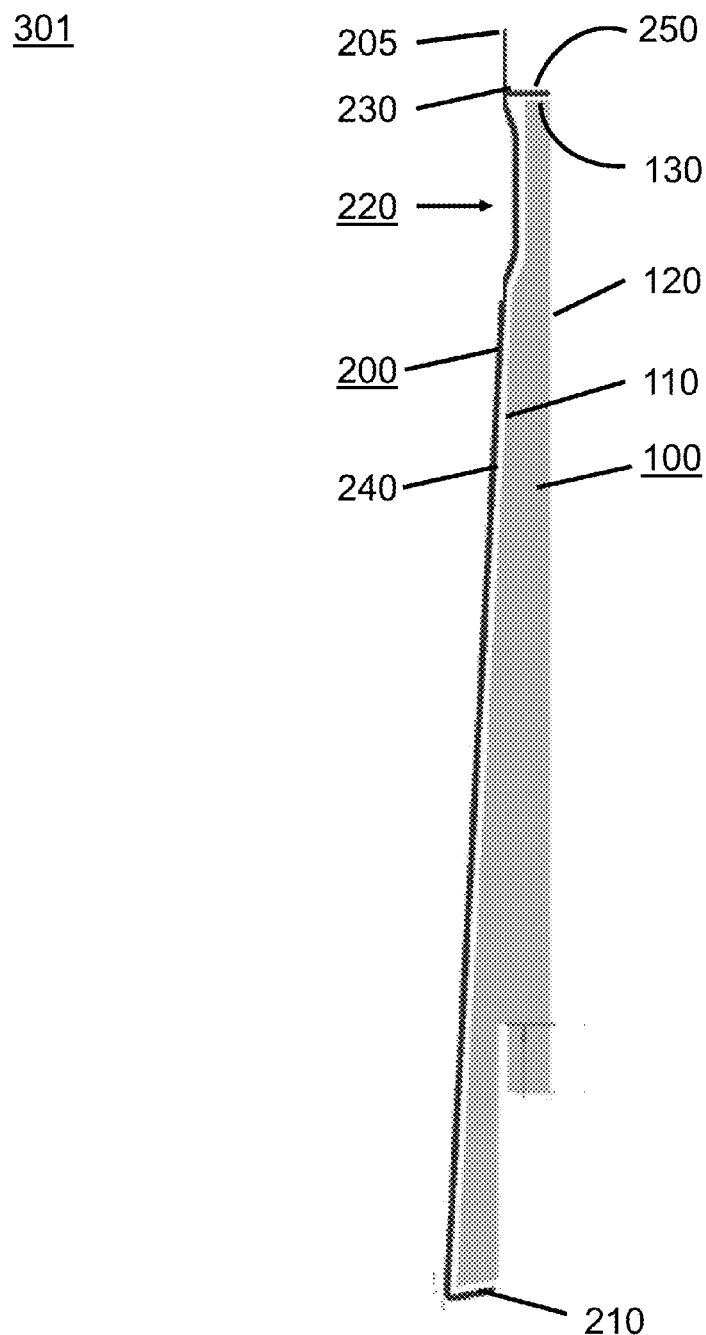
FIG. 8 is a side view of a third exemplary embodiment of an insulating panel of the present disclosure.
Figure 9:
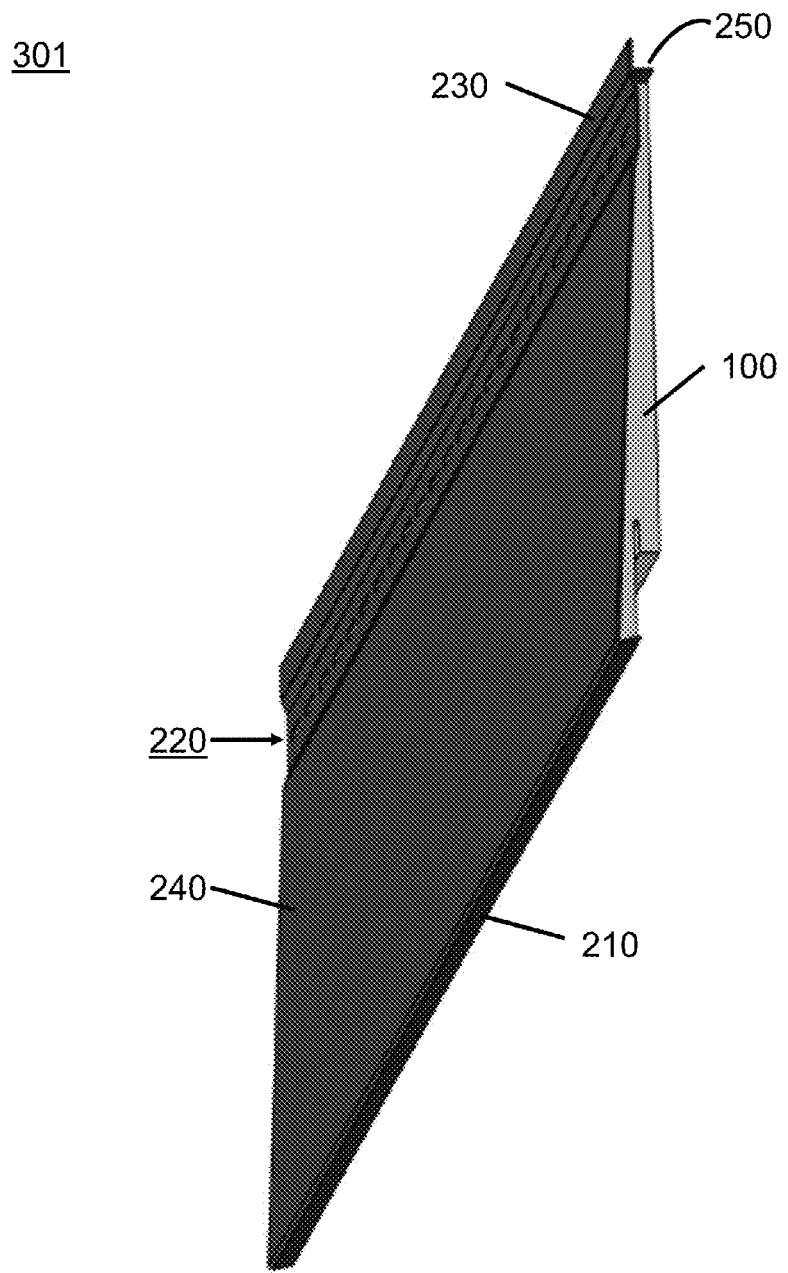
FIG. 9 is a perspective view of the insulating panel of FIG. 8.
Figure 10:
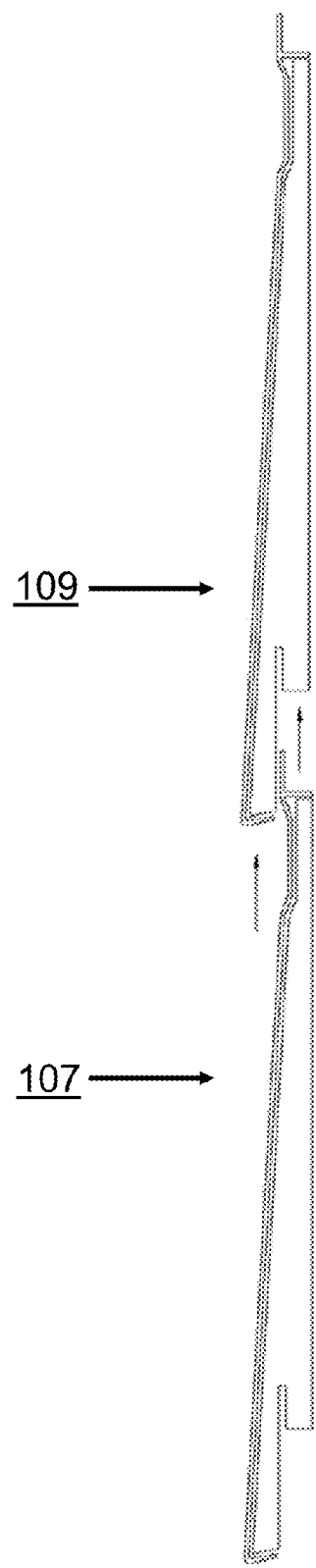
FIG. 10 is a side view showing how two insulating panels of FIG. 8 are joined to each other vertically.

FIGS. 8-10 are various views of a third exemplary embodiment 301 of the composite insulating panel. FIG. 8 is a side view. FIG. 9 is a perspective view. FIG. 10 is a side view showing two panels vertically aligned with each other, but not yet joined together.

The composite panel 301 illustrated in FIG. 8 is very similar to that of FIG. 5. The composite panel 301 comprises a backing member 100 and a siding member 200, and the prior description of these two components also applies to this embodiment.

The main difference here is in the structure of the siding member 200. The siding member has a veneer 240, a bottom lip 210, a top edge 205, a nailing divot 220, and an upper strip 230 as previously described. The siding member also has a top wall or top lip 250 that extends rearward from a location above the nailing divot 220 and below the upper strip 230. The top wall 250 is thus adjacent to the top face 130 of the backing member. As best seen in FIG. 8, the top face 130 of the backing member is substantially perpendicular to the front face 110 and rear face 120 of the backing member. However, in the event the top face 130 of the backing member is angled, it is contemplated that the top wall 250 is also angled, so that the top wall 250 remains substantially parallel to and adjacent the top face 130. In this embodiment, the tongue 235 is formed from only the upper strip 230 of the siding member.

Figure 11:
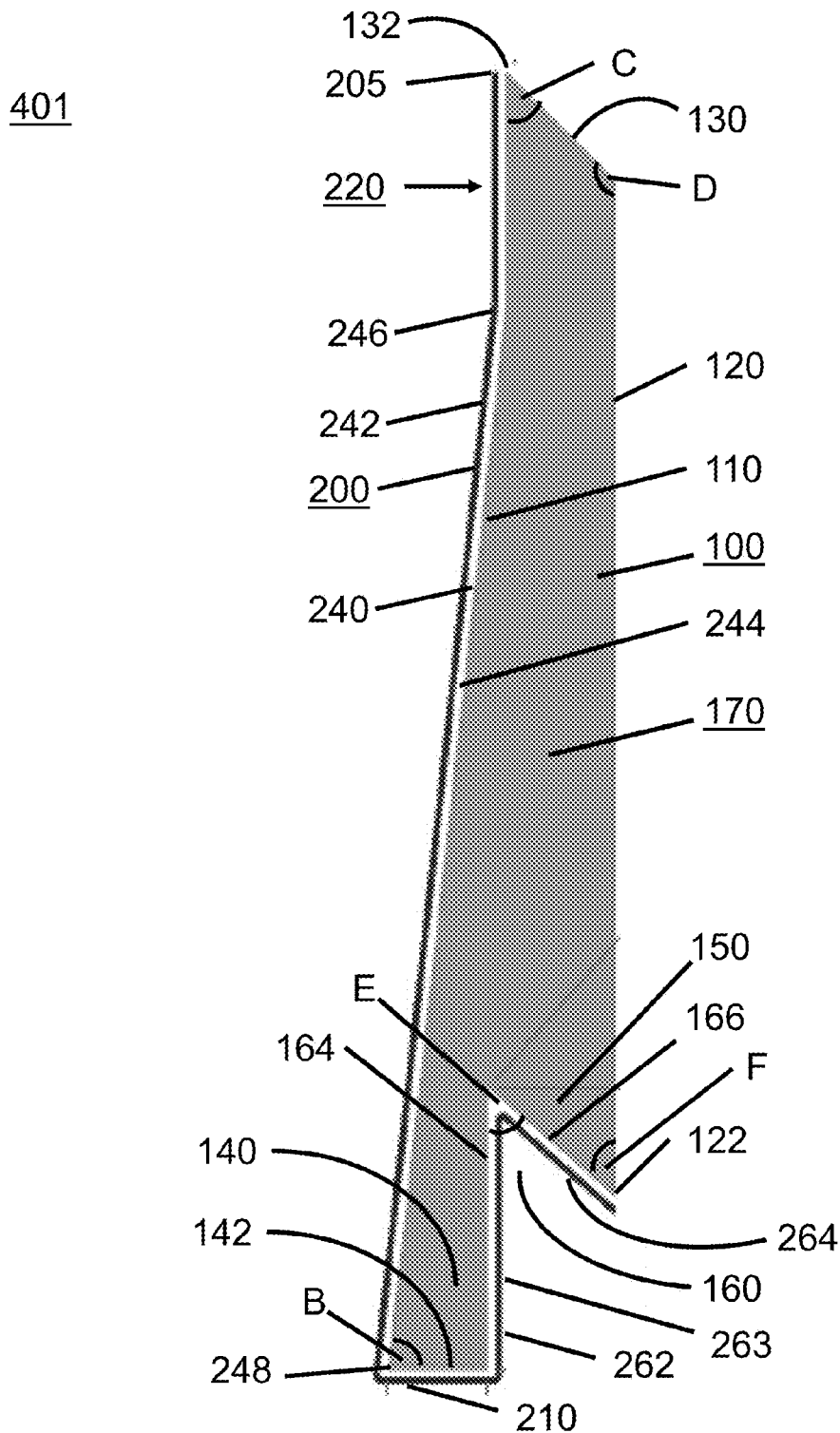
FIG. 11 is a side view of a fourth exemplary embodiment of an insulating panel of the present disclosure.
Figure 12:
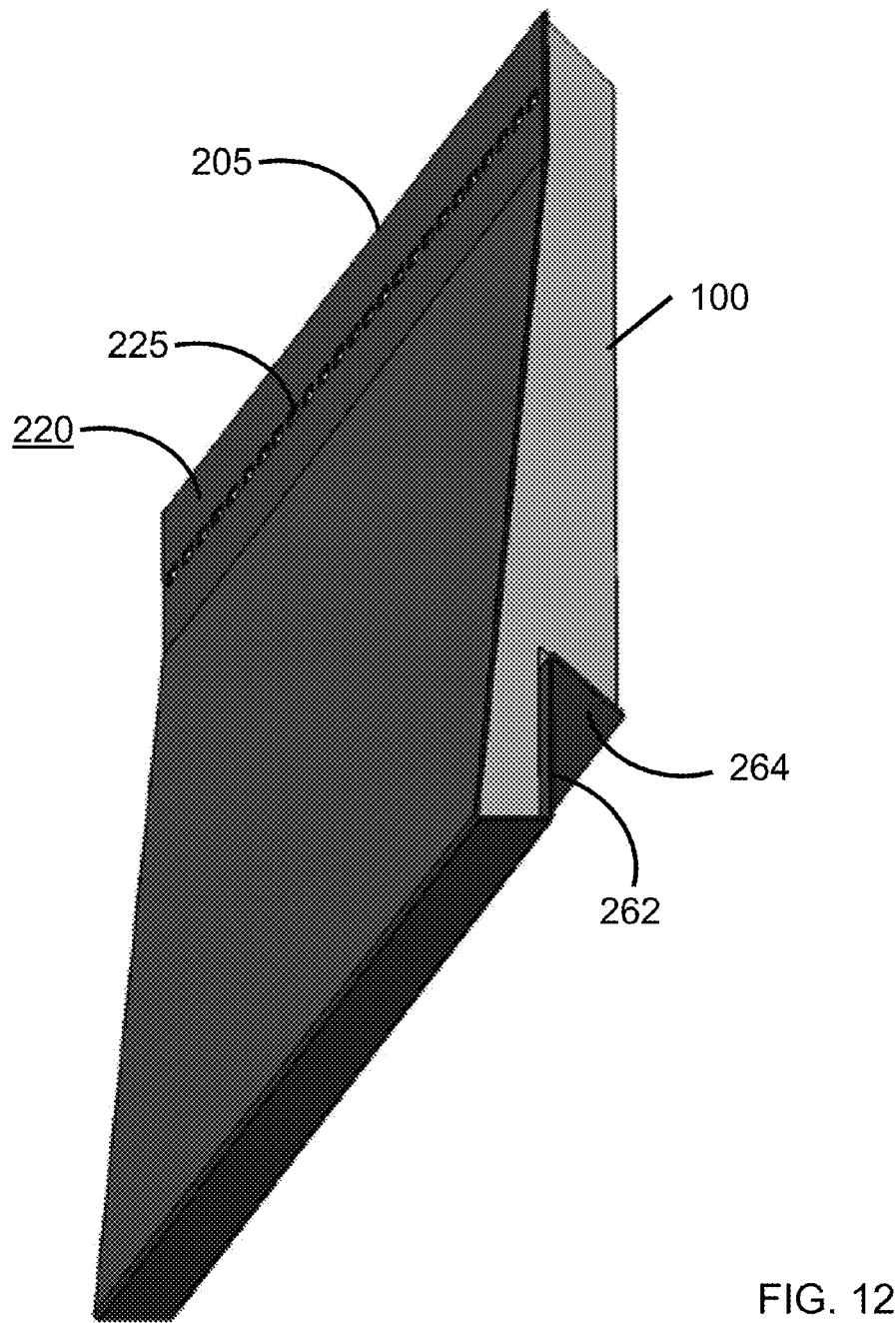
FIG. 12 is a perspective view of the insulating panel of FIG. 11.
Figure 13:
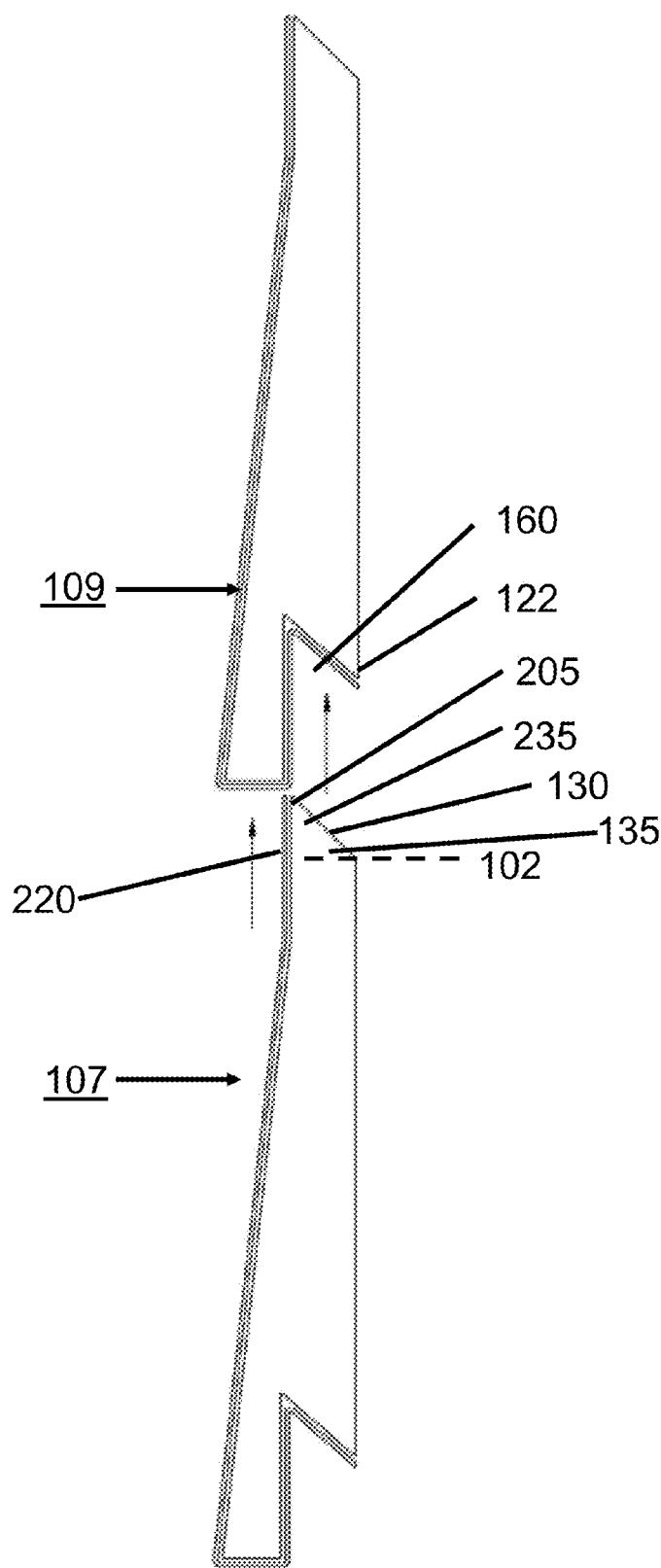
FIG. 13 is a side view showing how two insulating panels of FIG. 11 are joined to each other vertically.

FIGS. 11-13 are various views of a fourth exemplary embodiment 401 of the composite insulating panel. FIG. 11 is a side view. FIG. 12 is a perspective view. FIG. 13 is a side view showing two panels vertically aligned with each other, but not yet joined together.

Referring first to FIG. 11, the backing member 100 has a front face 110, a rear face 120, a top face 130, a bottom face, a first side face 170, and a second side face (not visible). The front face 110 is located opposite the rear face 120. The first side face 170 is located opposite the second side face (not visible). The front face 110, the rear face 120, and the top face 130 are each substantially flat. As illustrated here, the top face 130 is angled relative to the front face 110 and the rear face 120. The top face 130 forms an acute angle C with the front face 110 at top front edge 132. The top face 130 also forms an obtuse angle D with the rear face 120. Again, there is no requirement for the top face 130 to be flat, or for a defined edge between the top face 130 and the rear face 120. For example, the top face 130 could be curved. Again, the front face 110 of the backing member 100 is angled with respect to the rear face 120 of the backing member 100. Put another way, the backing member does not have a constant thickness between the front face 110 and the rear face 120 as one moves upward from the bottom face to the top face 130. In addition, the front face 110 of the backing member forms an acute angle B with the front bottom face 142 of the backing member.

In this embodiment, a groove 160 is again present in the bottom face of the backing member. The groove is formed by a front face or front wall 164 and a rear face or rear wall 166 that are connected directly to each other, with no upper face in between. An acute angle E is formed between the front face 164 and the rear face 166. The rear face 166 of the groove joins the rear face 120 of the backing member at rear bottom edge 122. An acute angle F is formed between the rear face 166 of the groove and the rear face 120 of the backing member. Put another way, the front wall 164 and the rear wall 166 diverge from each other. A front section 140 is present in this embodiment, along with a front bottom face 142. A rear section 150 is also present, though this rear section does not have a rear bottom face. Here, the front face 164 of the groove is longer than the rear face 166 of the groove. As a result, the front section 140 will cover the nailing divot of a panel located below it, as best seen in FIG. 13.

Continuing with FIG. 11, the siding member 200 is formed from a veneer 240, a top edge 205, and a nailing divot 220. The veneer 240 has a front face 242, a top edge 246, and a bottom edge 248. The veneer 240 is flat (though it can have a slight radius in the face to make extrusion easier) and has a constant thickness between the front face 242 and the rear face 244 from the top edge 246 to the bottom edge 248. The front face 110 of the backing member 100 is attached to the rear face 244 of the siding member. Here, again, the rear face 244 is made up of the rear of the veneer and the nailing divot, In this embodiment, the top edge 205 is formed by the top edge of the nailing divot. In other words, no upper strip is present, and the nailing divot defines the top edge of the siding member. In addition, this particular nailing divot 220 is not recessed, or put another way no upper wall 222 or bottom wall 226 is present as in the embodiment of FIG. 1. The top edge 205 of the siding member aligns with the top front edge 132, i.e. they are adjacent each other.

A bottom lip 210 extends backward from the bottom edge 248 of the veneer. The bottom lip is adjacent to the front bottom face 142, i.e. a portion of the bottom face.

In this embodiment, the siding member 200 also includes a groove lining 263. The groove lining 263 is formed from a forward face 262 and a rearward face 264. The rearward face 264 connects only to one end of the forward face 262. The other end of the forward face 262 is also connected to the rearward end of the bottom lip 210. The forward face 262 abuts the front face 164 of the groove. The rearward face 264 abuts the rear face 166 of the groove.

Turning now to FIG. 12, the apertures 225 are visible in the nailing divot 220.

In this embodiment, the tongue 235 of the composite insulating panel is formed from (i) a portion of the siding member that includes the top edge 205, and (ii) a portion 135 of the backing member. This is better illustrated in FIG. 13. The tongue 235 of the lower panel 107 is that portion above dotted line 102. Here, the tongue 235 includes a portion 135 of the backing member which is located along the top edge 130, and a part of the nailing divot 220. The tongue fits into the groove 160, which extends down to rear bottom edge 122 of the upper panel 109.

Figure 14:
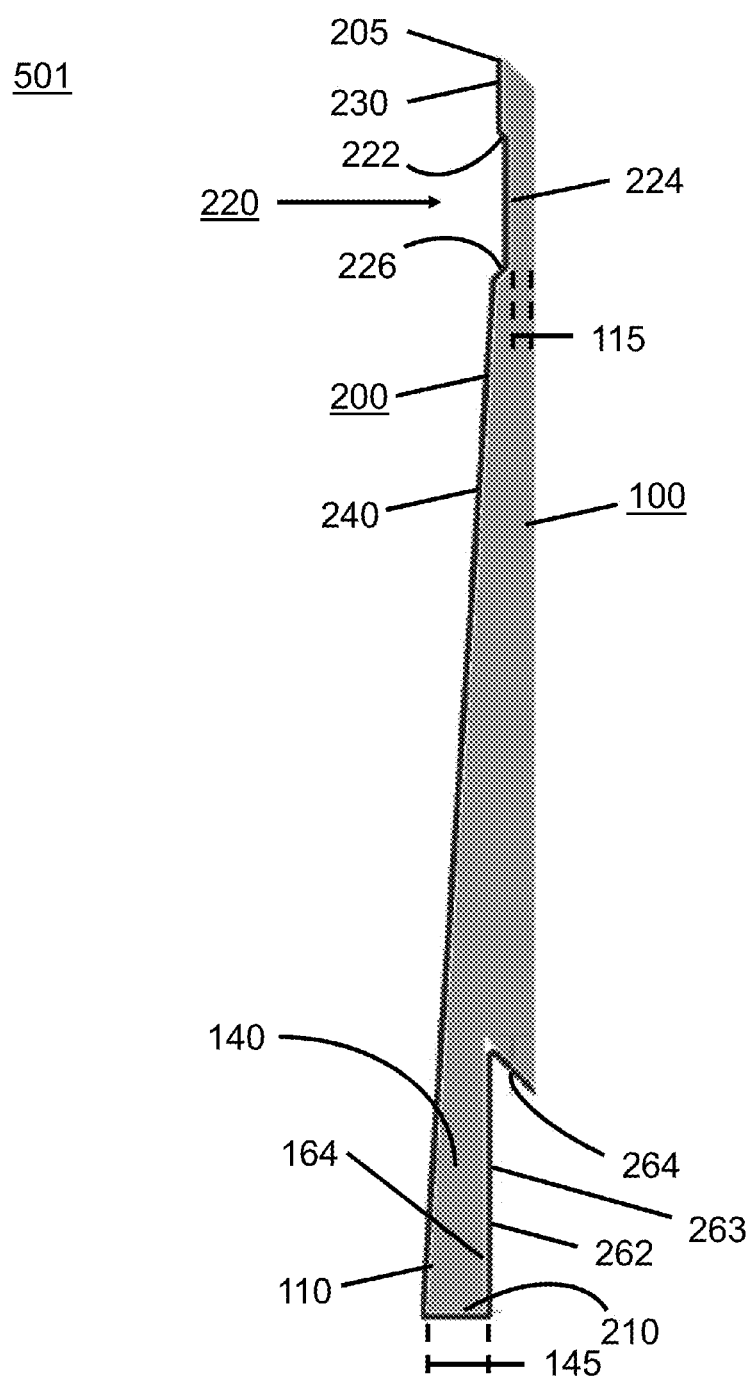
FIG. 14 is a side view of a fifth exemplary embodiment of an insulating panel of the present disclosure.
Figure 15:
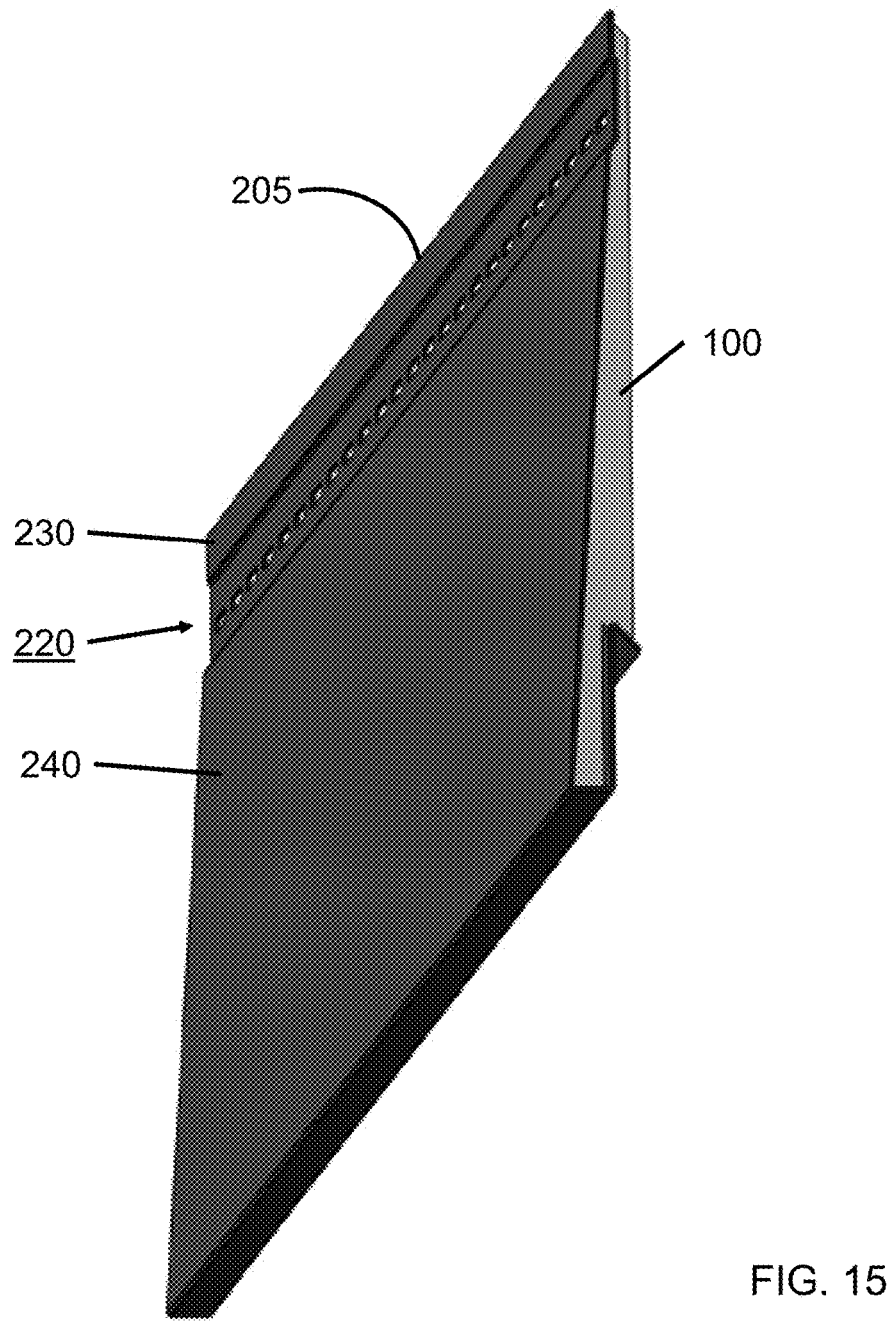
FIG. 15 is a perspective view of the insulating panel of FIG. 14.
Figure 16:
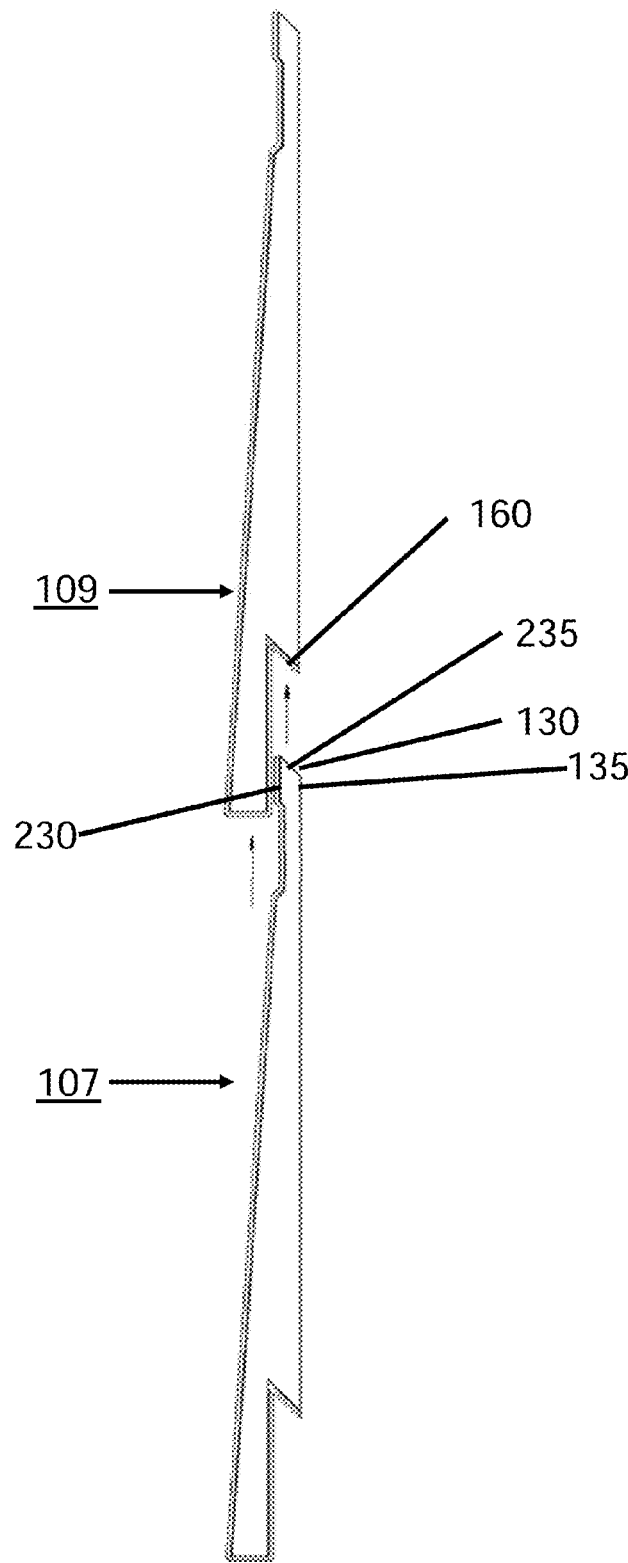
FIG. 16 is a side view showing how two insulating panels of FIG. 14 are joined to each other vertically.

FIGS. 14-16 are various views of a fifth exemplary embodiment 501 of the composite insulating panel. FIG. 14 is a side view. FIG. 15 is a perspective view. FIG. 16 is a side view showing two panels vertically aligned with each other, but not yet joined together. This embodiment also includes a siding member 200 and a backing member 100.

This embodiment is very similar to that of FIG. 11, and much of that description also applies to this embodiment. One difference in FIG. 14 is that the siding member 200 includes an upper strip 230 above the nailing divot 220. The top edge 205 of the siding member is the top edge of the upper strip. In addition, the nailing divot 220 is recessed, and includes upper wall 222 and bottom wall 226. The upper wall 222 joins the nailing wall 224 and the upper strip 230. The bottom wall 226 joins the nailing wall 224 and the veneer 240. A groove lining 263 formed from forward face 262 and rearward face 264 is also connected to the bottom lip 210 of the siding member.

The backing member 100 also has a front section 140. The front section has a thickness 145 which is measured as the distance from the front face 164 of the groove to the front face 110 of the backing member. The backing member 100 also has an insulation thickness 115 which is measured as the distance between the rear face 120 of the backing member and the front face 110 of the backing member at the nailing divot 220. These thicknesses will be discussed further herein.

Turning now to FIG. 16, the tongue 235 of the lower panel 107 is formed from the upper strip 230 and a portion 135 of the siding member located along the top edge 130. The tongue 235 engages the groove 160 of the upper panel 109.

Figure 17:
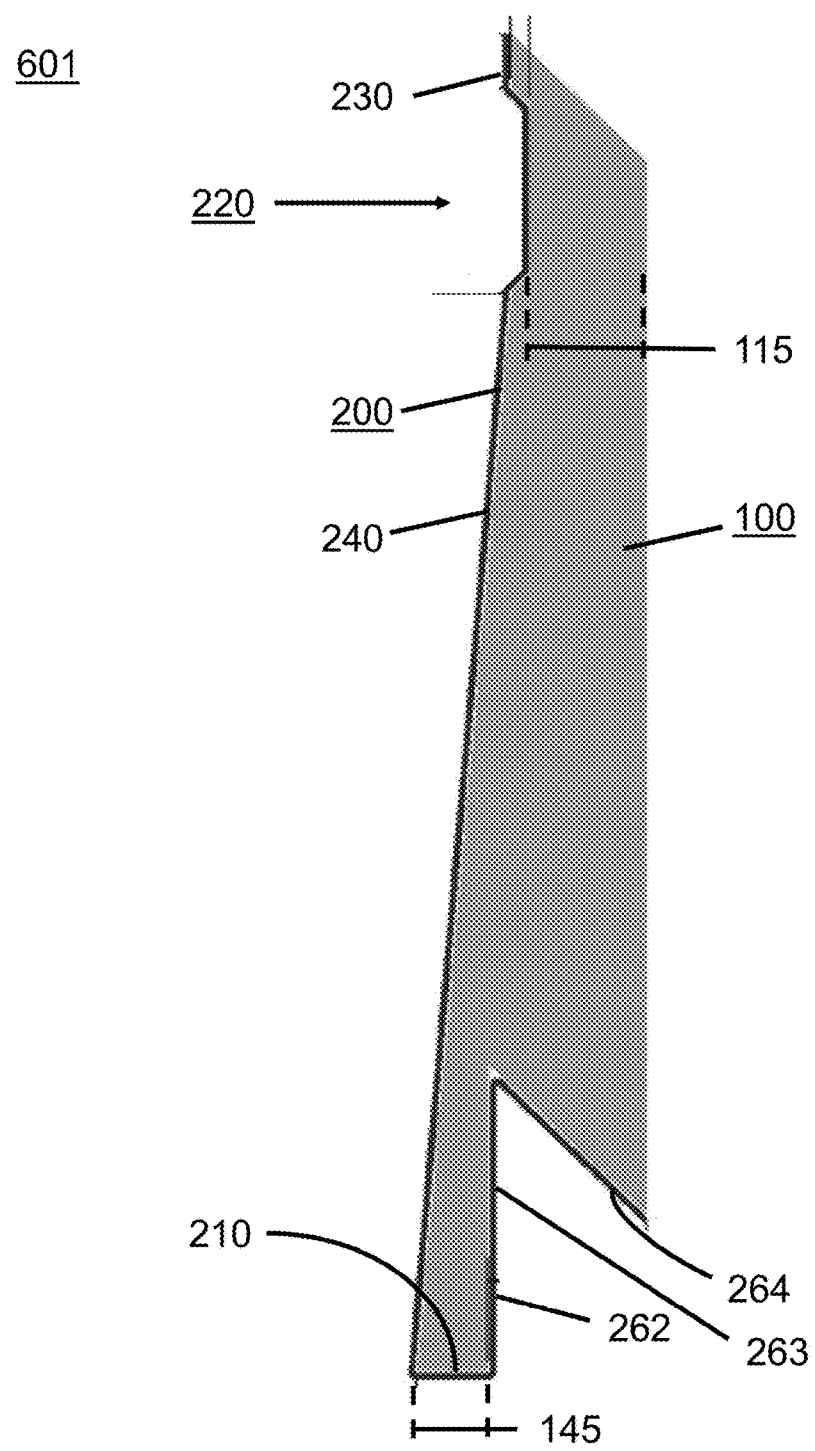
FIG. 17 is a side view of a sixth exemplary embodiment of an insulating panel of the present disclosure.
Figure 18:
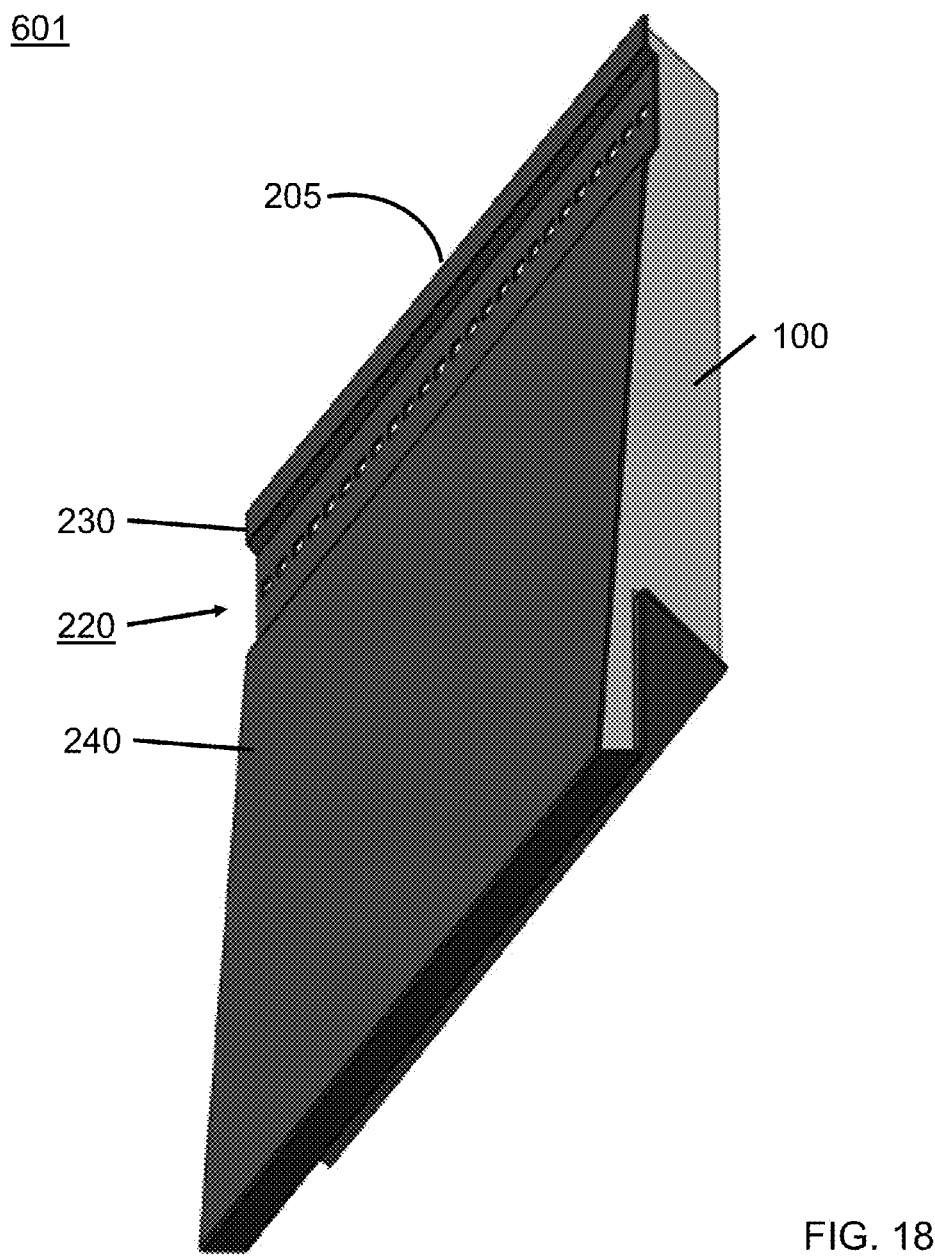
FIG. 18 is a perspective view of the insulating panel of FIG. 17.
Figure 19:
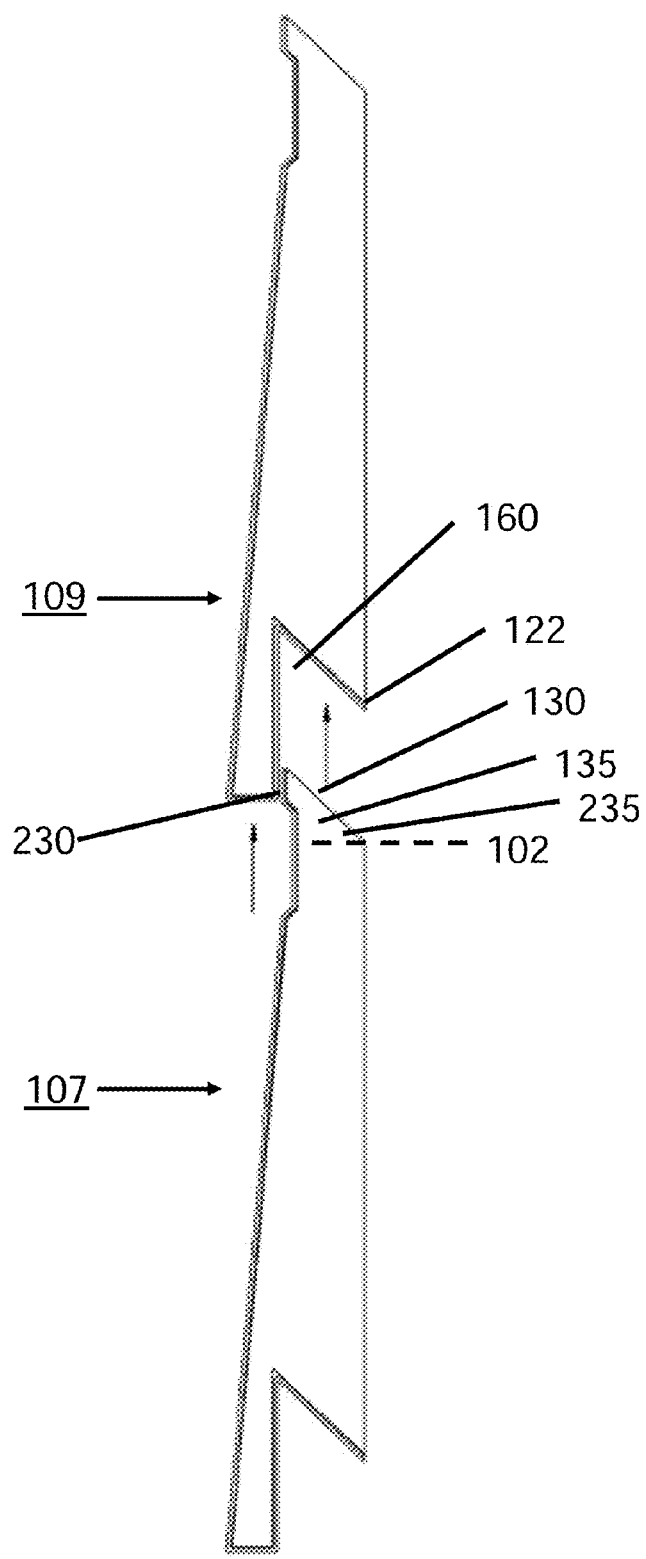
FIG. 19 is a side view showing how two insulating panels of FIG. 17 are joined to each other vertically.

FIGS. 17-19 are various views of a sixth exemplary embodiment 601 of the composite insulating panel. FIG. 17 is a side view. FIG. 18 is a perspective view. FIG. 19 is a side view showing two panels vertically aligned with each other, but not yet joined together. This embodiment also includes a siding member 200 and a backing member 100.

The embodiment of FIG. 17 is very similar to that of FIG. 14, and that description also applies to this embodiment. Indicated here are backing member 100 and siding member 200. The siding member includes upper strip 230, nailing divot 220, and veneer 240, bottom lip 210, and a groove lining 263 formed from groove lining forward face 262 and groove lining rearward face 264.

The main difference between FIG. 14 and FIG. 17 lies in the front section thickness 145 and the insulation thickness 115. In FIG. 14, the front section thickness 145 is greater than the insulation thickness 115. However, in FIG. 17, the insulation thickness 115 is greater than the front section thickness 145.

For example, in FIG. 14, the backing member has a top thickness of from about 0.2 inches to about 0.5 inches; and the backing member has a bottom thickness of about 0.5 inches to about 1 inch. However, in FIG. 17, the backing member has a top thickness of from about 0.9 inches to about 1.2 inches; and the backing member has a bottom thickness of about 1.4 inches to about 1.8 inches.

As seen in FIG. 19, the tongue 235 of the lower panel 107 is that portion above dotted line 102. Here, the tongue 235 includes a portion 135 of the backing member which is located along the top edge 130, and the upper strip 230. The tongue fits into the groove 160, which extends down to rear bottom edge 122 of the upper panel 109.

Figure 20:
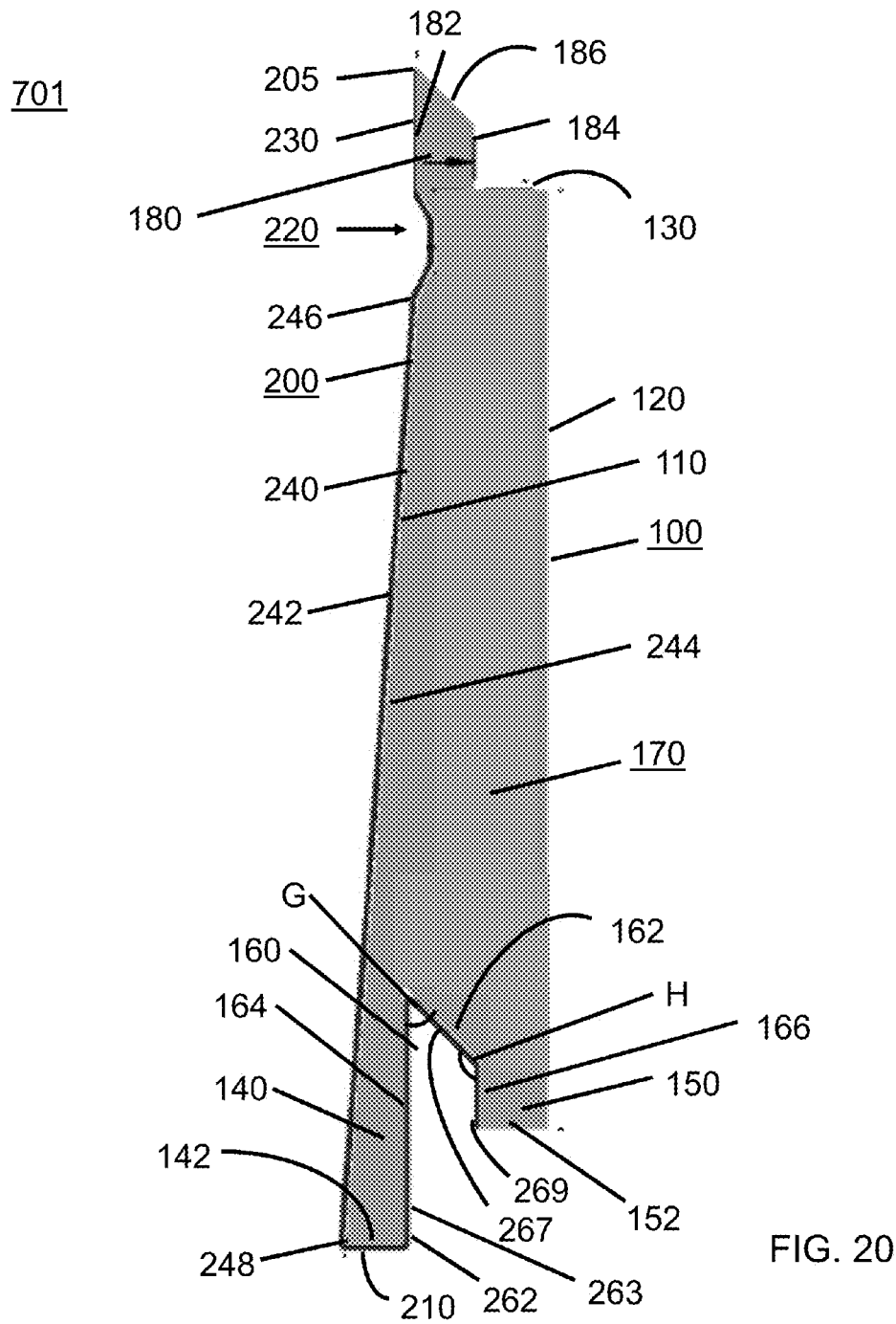
FIG. 20 is a side view of a seventh exemplary embodiment of an insulating panel of the present disclosure.
Figure 21:
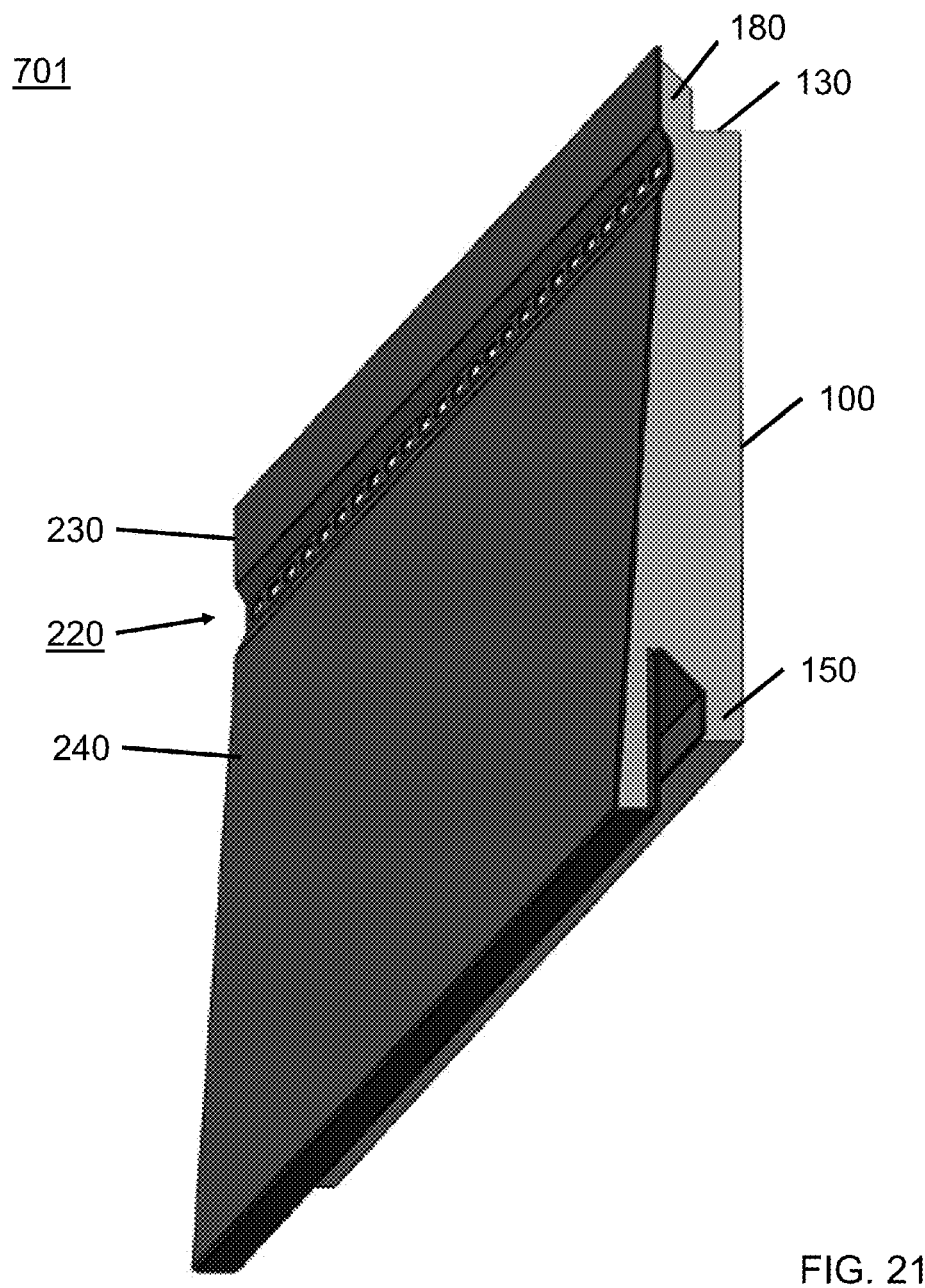
FIG. 21 is a perspective view of the insulating panel of FIG. 20.
Figure 22:
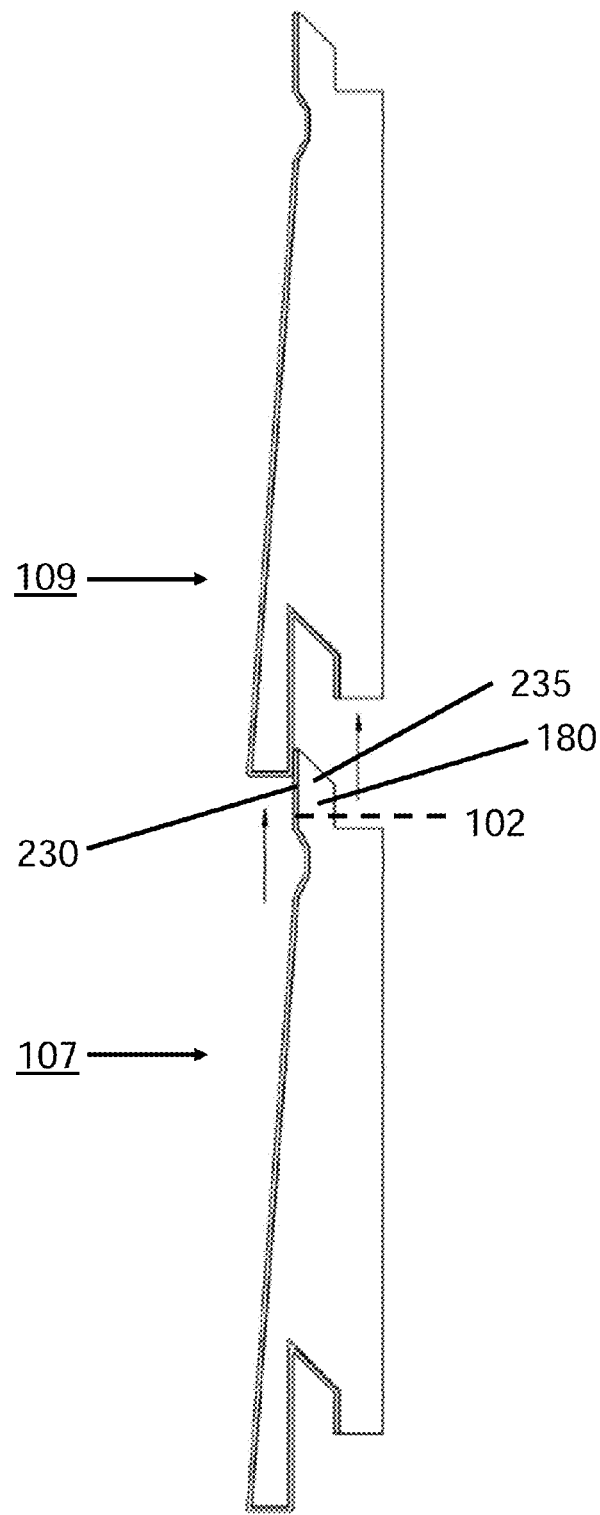
FIG. 22 is a side view showing how two insulating panels of FIG. 20 are joined to each other vertically.

FIGS. 20-22 are various views of a seventh exemplary embodiment 701 of the composite insulating panel. FIG. 20 is a side view. FIG. 21 is a perspective view. FIG. 22 is a side view showing two panels vertically aligned with each other, but not yet joined together. This embodiment also includes a siding member 200 and a backing member 100.

Referring first to FIG. 20, the backing member 100 has a front face 110, a rear face 120, a top face 130, a bottom face, a first side face 170, and a second side face (not visible). Similar to the embodiment of FIG. 1, the backing member is separated into a front section 140 and a rear section 150 along the bottom face. The bottom face is in two parts here, with the front section 140 having a front bottom face 142 and the rear section 150 having a rear bottom face 152. The front face 110 is located opposite the rear face 120. The top face 130 is located opposite the bottom face 142/152. The first side face 170 is located opposite the second side face (not visible). The front face 110, the rear face 120, the top face 130, and the bottom face are each substantially flat. As illustrated here, the top face 130 is substantially parallel to the rear bottom face 152 of the backing member. Again, the front face 110 of the backing member 100 is angled with respect to the rear face 120 of the backing member 100.

A groove 160 is again present in the bottom face of the backing member. The groove 160 includes a front face 164, a rear face 166, and an upper face 162. The front face 164 is present along the front section 140, and the rear face 166 is present along the rear section 150. The upper face 162 connects the front face 164 to the rear face 166. As illustrated here, the groove has an acute angle G between the front face 164 and the upper face 162. The groove has an obtuse angle H between the upper face 162 and the rear face 166. The front face 164 and the rear face 166 of the groove are substantially parallel to each other.

In this embodiment, the front section 140 of the backing member extends downwards beyond the rear section 150. Again, this permits the front section 140 of an upper panel to cover the nailing divot of a similar lower composite panel.

Continuing with FIG. 20, the siding member 200 is formed from a veneer 240, a top edge 205, an upper strip 230, and a nailing divot 220 that is located between the veneer 240 and the upper strip 230. The veneer 240 has a front face 242 a top edge 246, and a bottom edge 248. The veneer 240 is flat and has a constant thickness between the front face 242 and the rear face 244 from the top edge 246 to the bottom edge 248. The front face 110 of the backing member 100 is attached to the rear face 244 of the siding member. In this embodiment, the top edge 205 is formed by the upper strip 230. This particular nailing divot 220 is also recessed. In this embodiment also, the rear face 244 is made up of the rear of the veneer, the nailing divot, and the upper strip.

A bottom lip 210 extends backward from the bottom edge 248 of the veneer. The bottom lip is adjacent to the front bottom face 142, i.e. a portion of the bottom face. The siding member 200 also includes a groove lining 263. The groove lining 263 is formed from a forward face 262 and a rearward face. The rearward face here is formed from two sections, a first section 267 that extends at an acute angle G in relation to the forward face 262, and a second section 269 that extends generally parallel to the forward face 262. The bottom edge of the forward face 262 is also connected to the rearward end of the bottom lip 210. The forward face 262 abuts the front face 164 of the groove. The rearward face 264 abuts the rear face 166 of the groove. The upper face 266 abuts the upper face 162 of the groove.

The backing member 100 includes a projection 180 that extends upward from the top face 130 of the backing member. The projection 180 has a front face 182, a rear face 184, and a top face 186. The top face 186 is angled downwards from the front face 182 to the rear face 184. The front face 182 of the projection is aligned with the front face 110 of the backing member. As seen here, the upper strip 230 abuts the projection 180. There is no requirement for the top face 186 to be flat, or for a defined edge between the top face 186 and the rear face 184 of the projection; for example, the top face 186 could be curved.

In this embodiment, the tongue 235 of the composite insulating panel is formed from (i) the projection 180 of the backing member, and (ii) the upper strip 230, which includes the top edge 205. Again, this is better illustrated in FIG. 22. The tongue 235 of the lower panel 107 is that portion above dotted line 102, and engages the upper panel 109.

Figure 23:
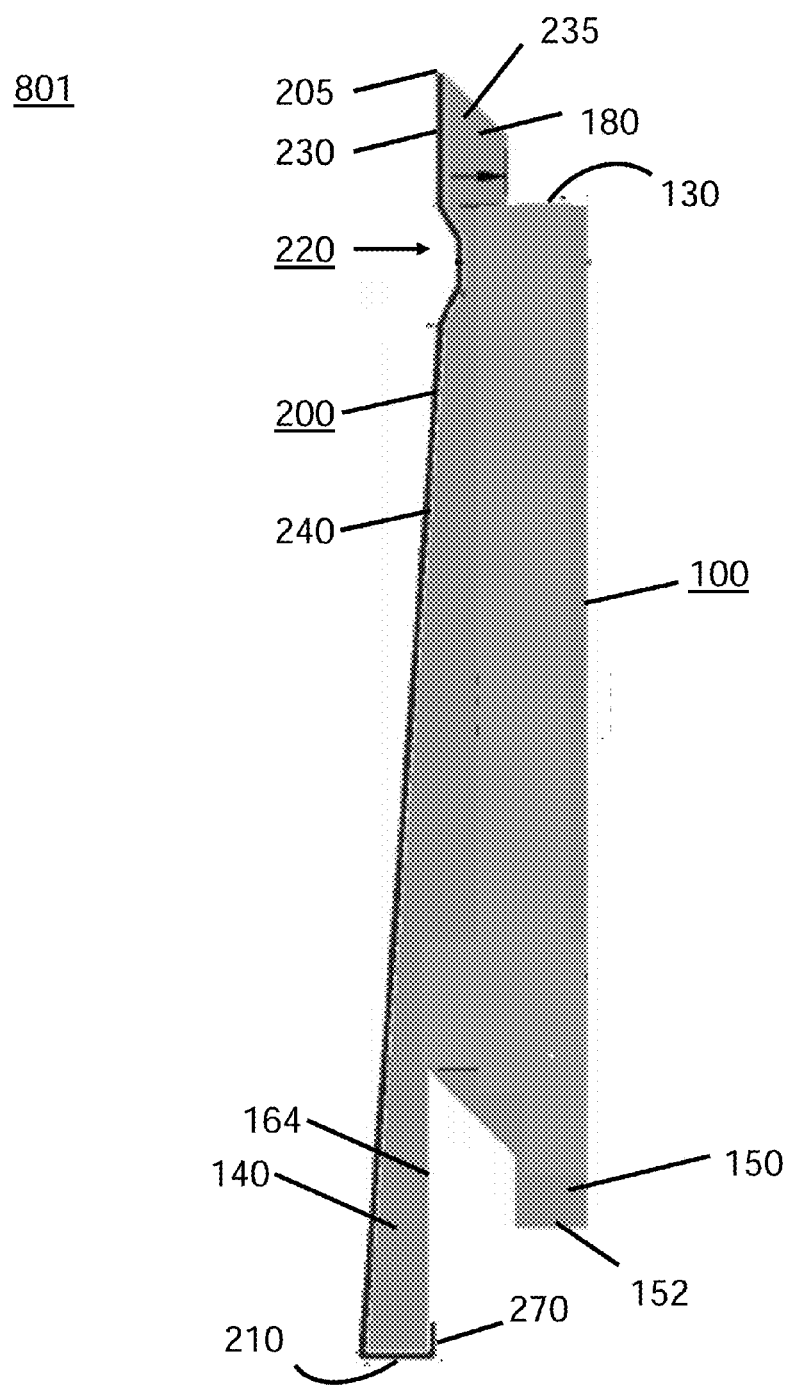
FIG. 23 is a side view of an eighth exemplary embodiment of an insulating panel of the present disclosure.
Figure 24:
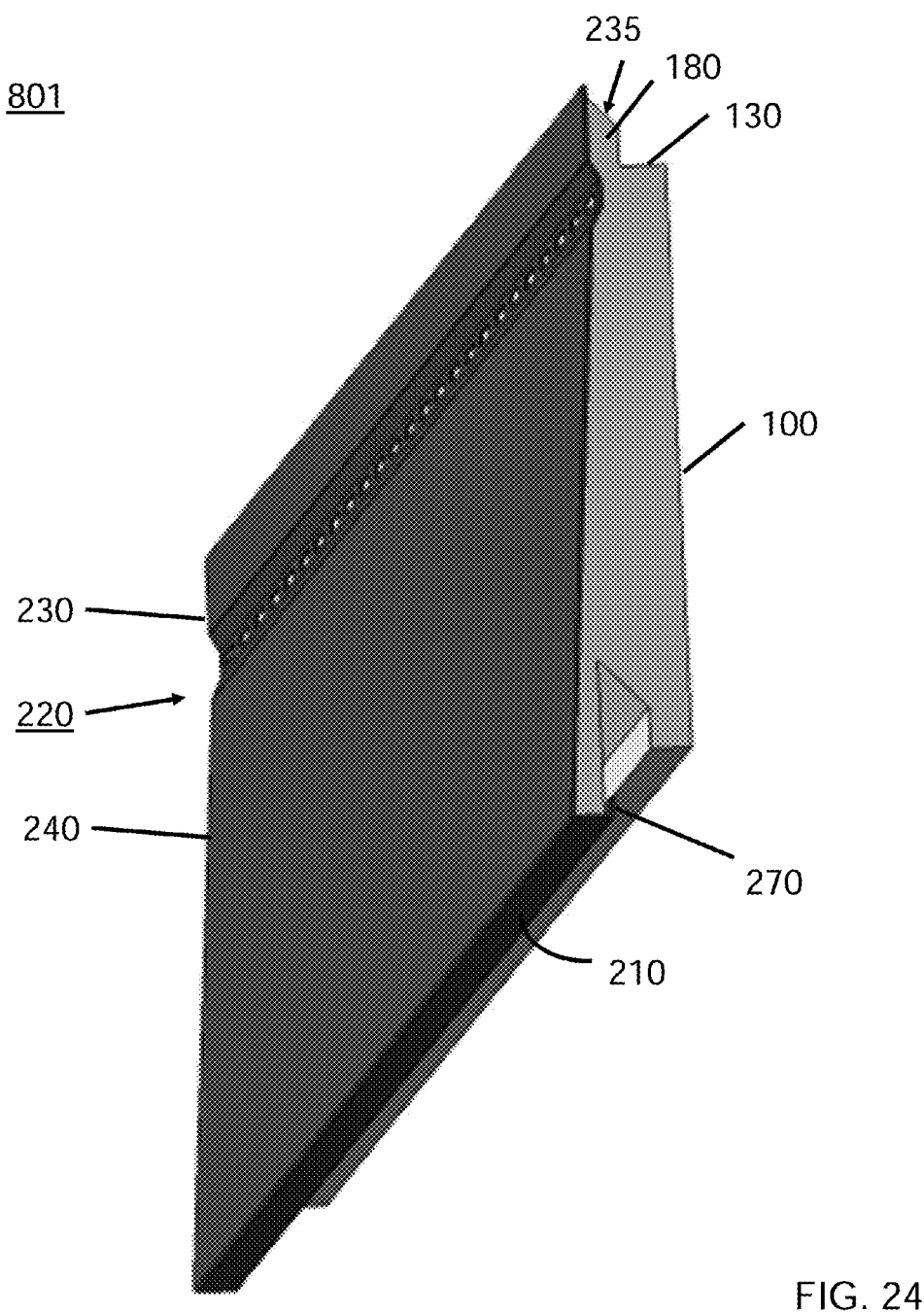
FIG. 24 is a perspective view of the insulating panel of FIG. 23.
Figure 25:
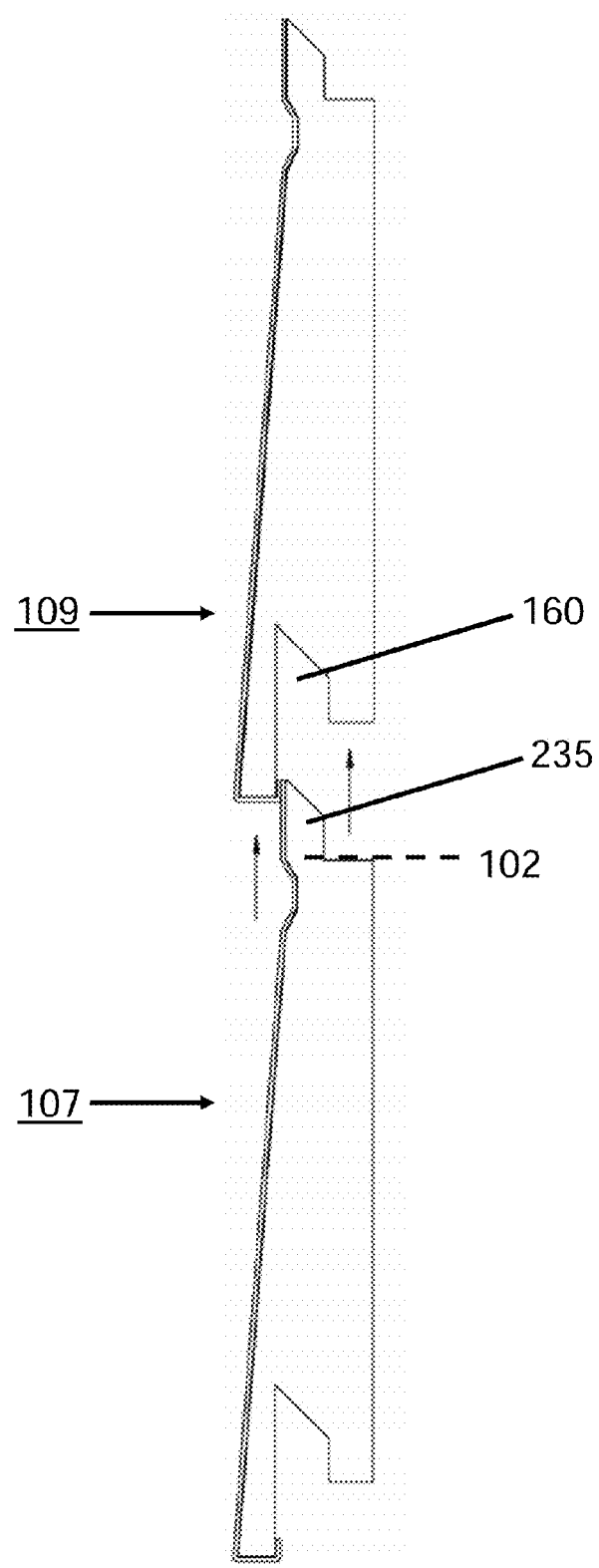
FIG. 25 is a side view showing how two insulating panels of FIG. 23 are joined to each other vertically.

FIGS. 23-25 are various views of a eighth exemplary embodiment 801 of the composite insulating panel. FIG. 23 is a side view. FIG. 24 is a perspective view. FIG. 25 is a side view showing two panels vertically aligned with each other, but not yet joined together.

This embodiment of FIG. 23 is very similar to that of FIG. 20, and that description also applies to this embodiment. Indicated here are backing member 100 and siding member 200. The siding member includes top edge 205, upper strip 230, nailing divot 220, veneer 240, and bottom lip 210. The backing member 100 includes a projection 180 extending upward from the top face 130 of the backing member. Again, the tongue 235 of the composite insulating panel is formed from (i) the projection 180 of the backing member, and (ii) the upper strip 230.

The main difference between FIG. 23 and FIG. 20 lies in the structure of the siding member abutting the groove 160. Here in FIG. 23, the siding member 200 includes a ledge or flange 270 that is connected to the rearward edge of the bottom lip 210, and extends upward abutting the front face 164 of the groove along the front section 140. The ledge or flange 270 is much shorter compared to the groove lining forward face 262 seen in FIG. 20. The ledge 270 does not extend to the same height as the rear bottom face 152 of the rear section 150.

As illustrated in FIG. 25, the tongue 235 of the lower panel 107 is that portion above dotted line 102. This tongue 235 enters the groove 160 of upper panel 109.

Figure 26:
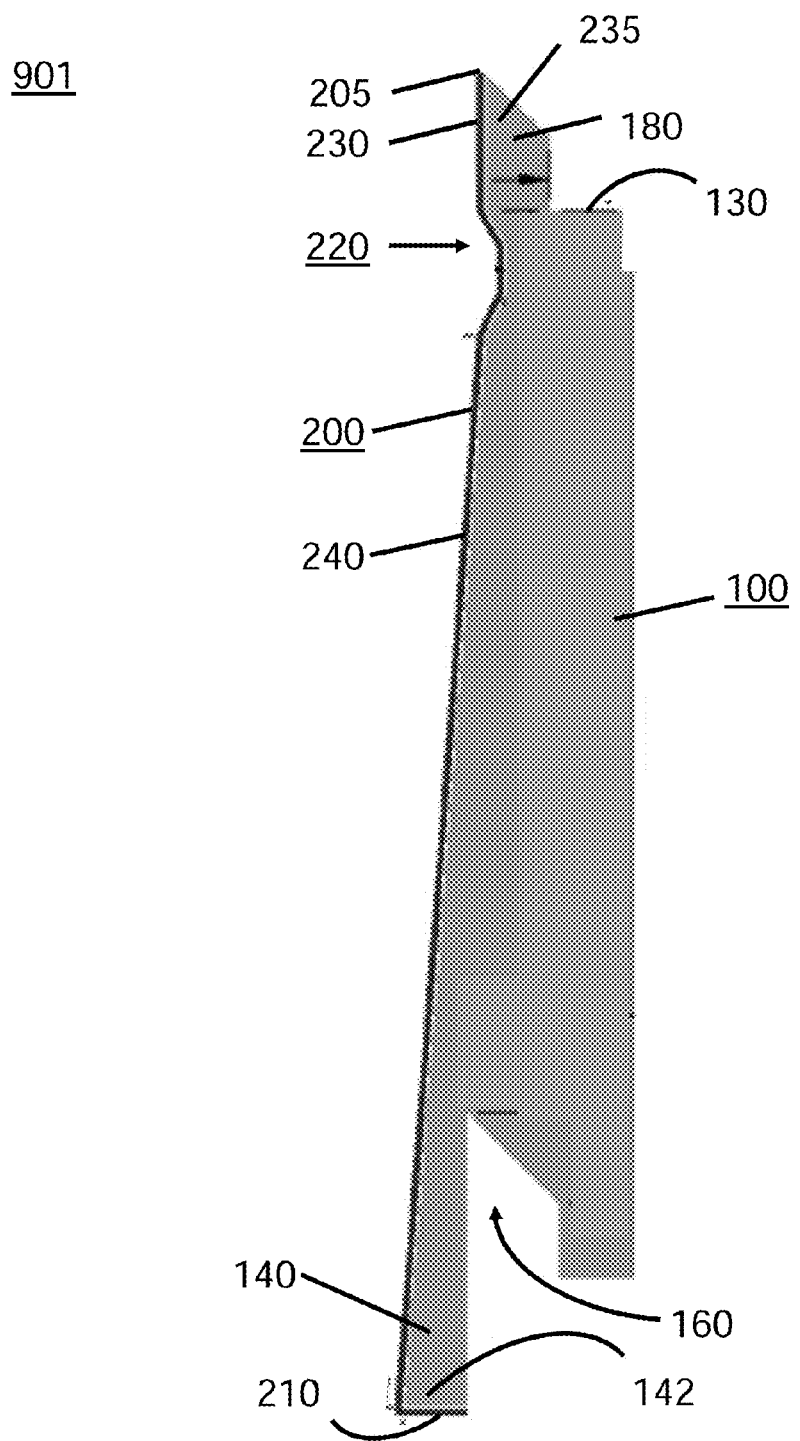
FIG. 26 is a side view of a ninth exemplary embodiment of an insulating panel of the present disclosure.
Figure 27:
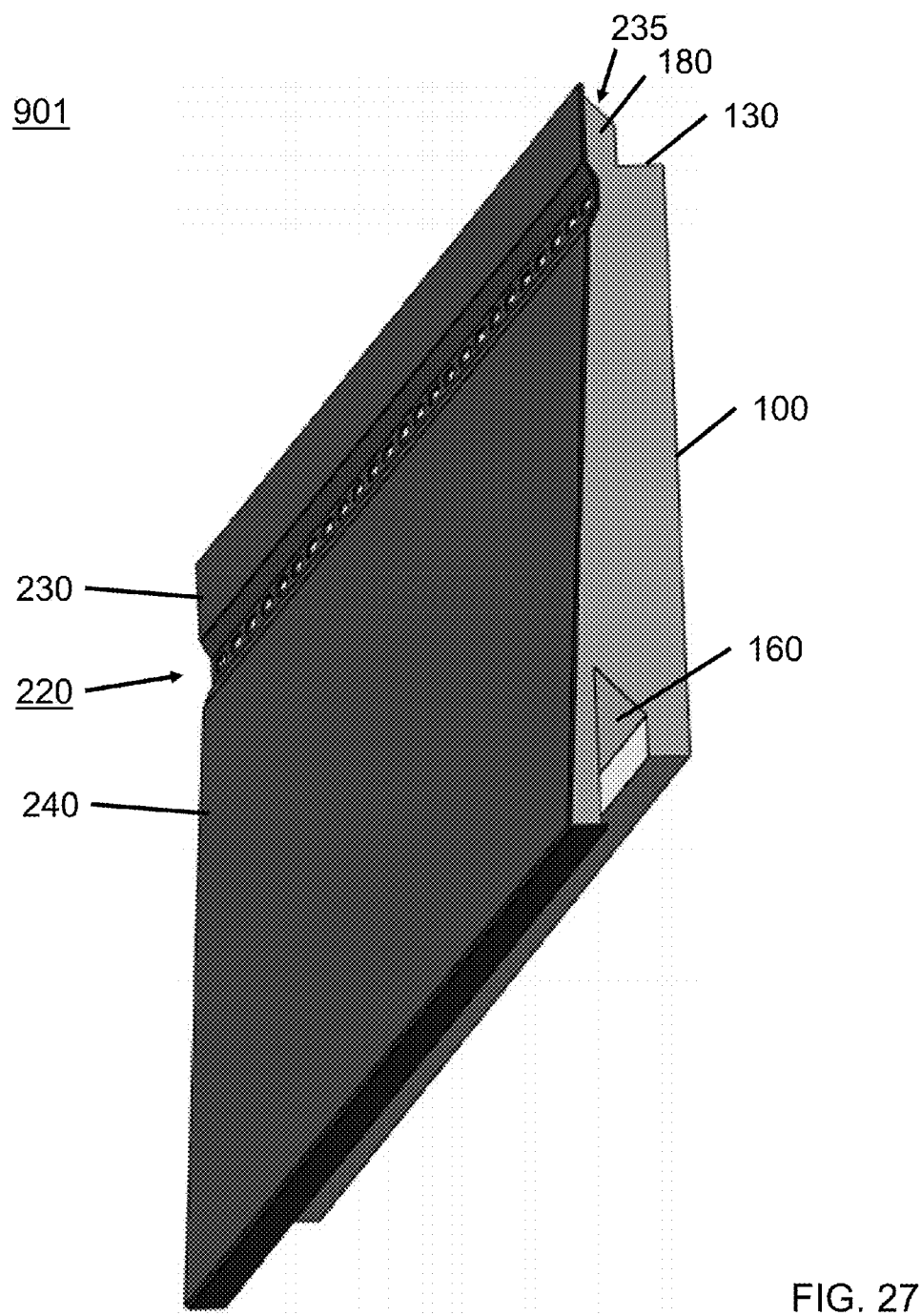
FIG. 27 is a perspective view of the insulating panel of FIG. 26.
Figure 28:
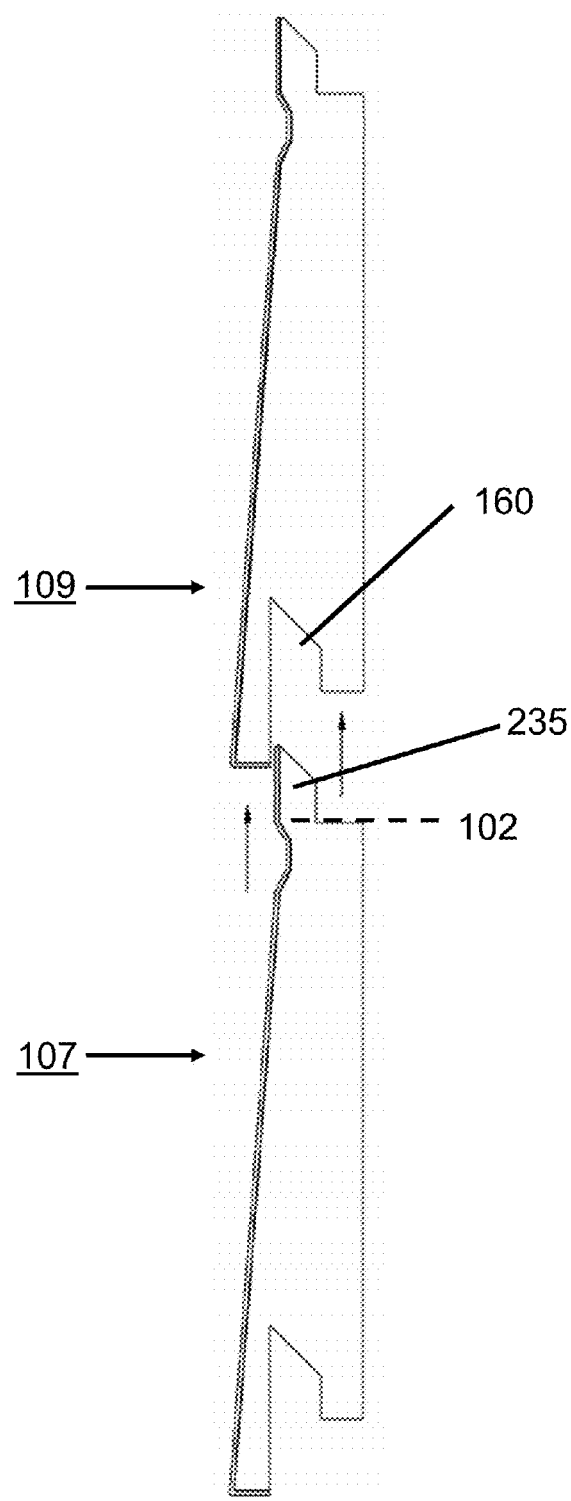
FIG. 28 is a side view showing how two insulating panels of FIG. 26 are joined to each other vertically.

FIGS. 26-28 are various views of a ninth exemplary embodiment 901 of the composite insulating panel. FIG. 26 is a side view. FIG. 27 is a perspective view. FIG. 28 is a side view showing two panels vertically aligned with each other, but not yet joined together.

This embodiment of FIG. 26 is also very similar to that of FIG. 20, and that description also applies to this embodiment. Indicated here are backing member 100 and siding member 200. The siding member includes top edge 205, upper strip 230, nailing divot 220, veneer 240, and bottom lip 210. The backing member 100 includes a projection 180 extending upward from the top face 130 of the backing member. Again, the tongue 235 of the composite insulating panel is formed from (i) the projection 180 of the backing member, and (ii) the upper strip 230.

The main difference between FIG. 26 and FIG. 20 is that here in FIG. 26, the groove 160 in the backing member is not abutted by any portion of the siding member 200. There is no groove lining as in FIG. 20, and no ledge as in FIG. 23. Only the bottom lip is present abutting the front bottom face 142 of the front section 140.

As illustrated in FIG. 28, the tongue 235 of the lower panel 107 is that portion above dotted line 102. This tongue 235 enters the groove 160 of upper panel 109. As seen in the figures of the various embodiments depicted herein, when locked together, there is almost no gap between the lower panel 107 and the upper panel 109.

Figure 29:
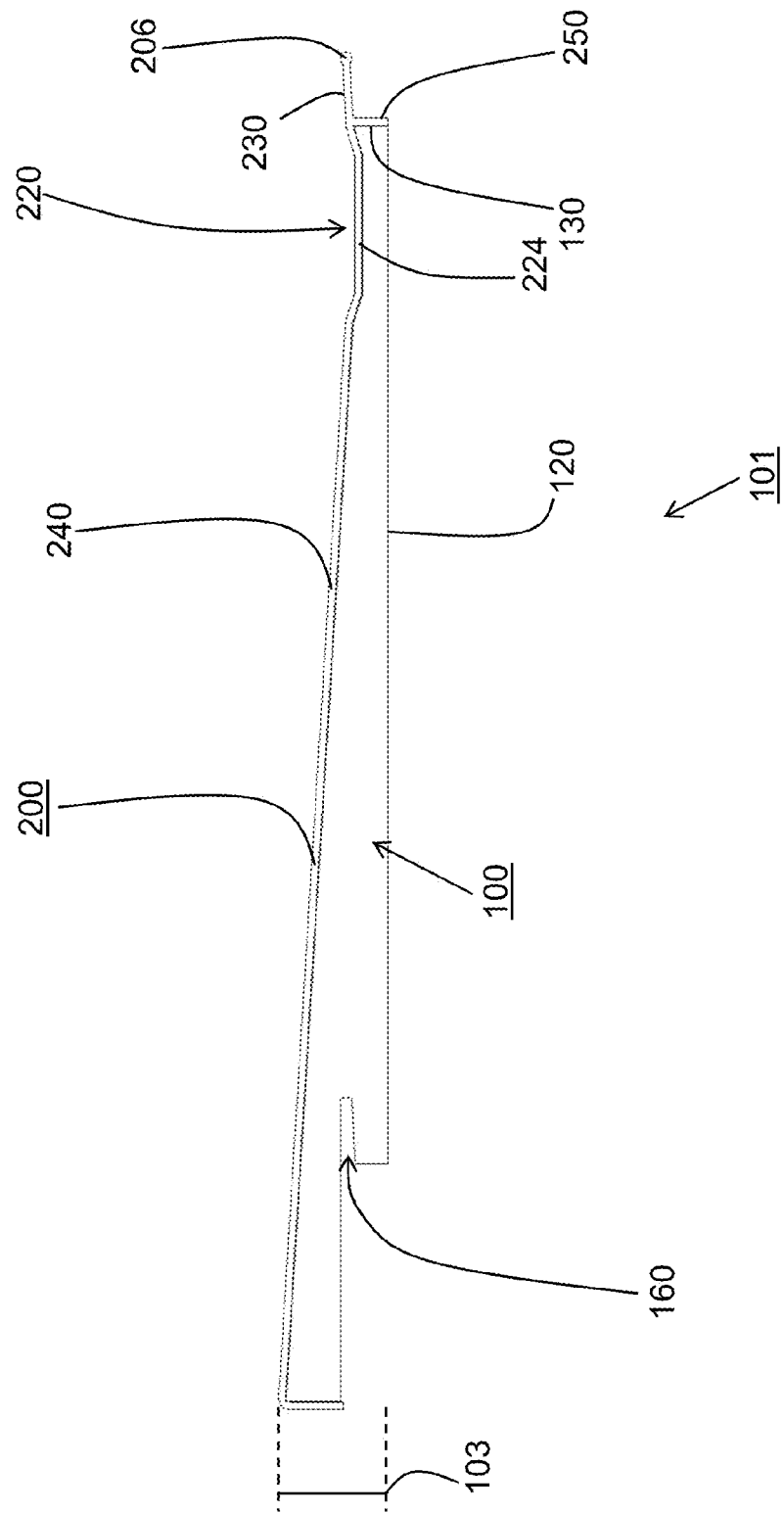
FIG. 29 is a side view of a tenth exemplary embodiment of an insulating panel of the present disclosure.
Figure 30:
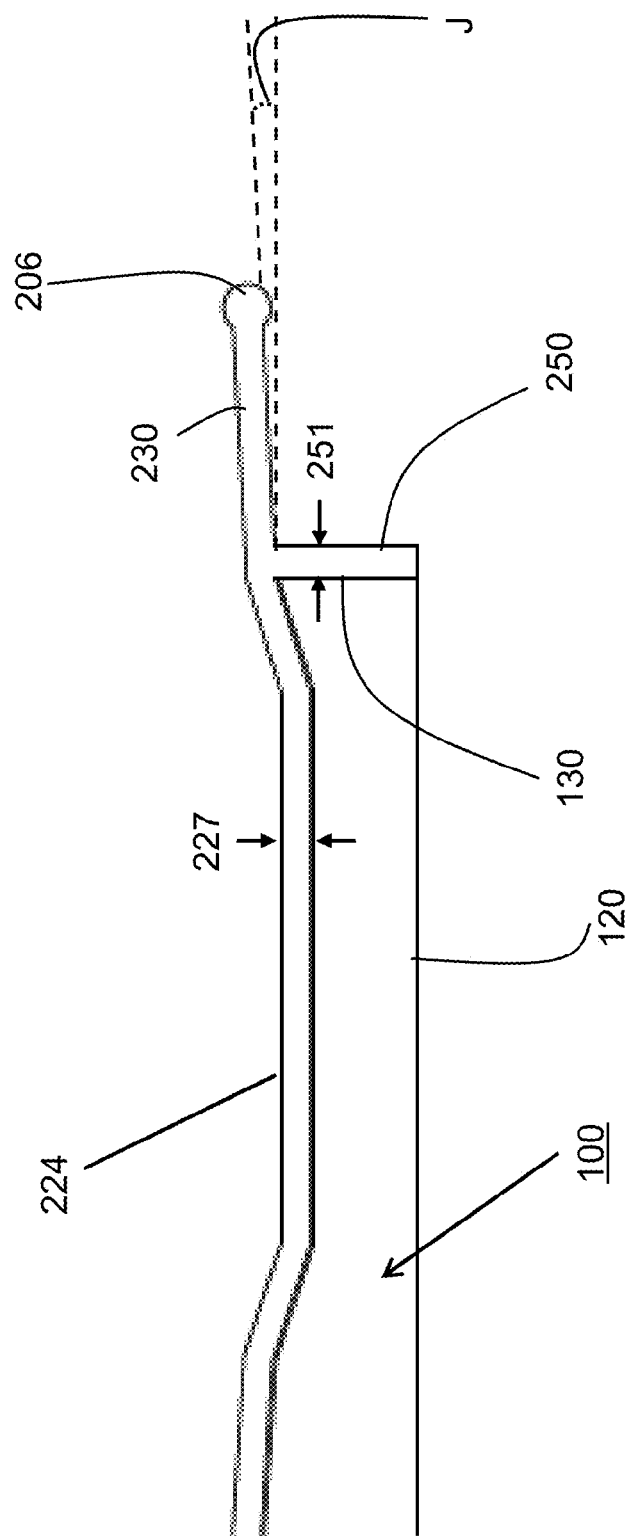
FIG. 30 is an enlarged side view of the upper strip area of the siding member of FIG. 29, showing a spherical bulb at the top edge of the siding member (i.e. the tongue has a bulbous tip). This particular figure shows the siding member as made by profile extrusion.
Figure 31:
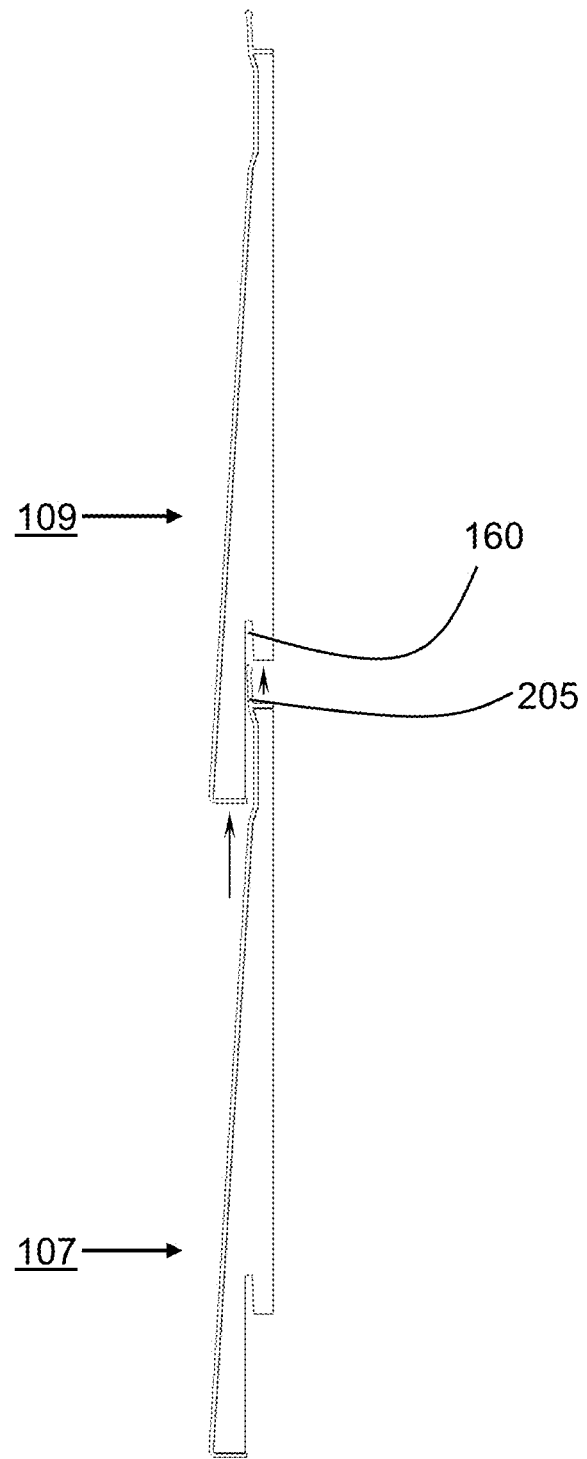
FIG. 31 is a side view showing how two insulating panels of FIG. 29 are joined to each other vertically.

FIGS. 29-31 are various views of a tenth exemplary embodiment of the composite insulating panel. FIG. 29 is a side view. FIG. 30 is an enlarged view of the area surrounding the upper strip of the siding member. FIG. 31 is a side view showing two panels vertically aligned with each other, but not yet joined together.

This embodiment of FIG. 29 is very similar to that of FIG. 8, and that description also applies to this embodiment. In this embodiment, the backing member 100 has a bottom thickness 103 that can be about 0.750 inches, or about 1.250 inches. The rear face 120 of the backing member and the groove 160 are also indicated. The siding member 200 has a veneer 240, a nailing divot 220, an upper strip 230, and a top wall 250. In this embodiment, the upper strip 230 is oriented at an angle so as to not be co-planar with the veneer 240. In addition, the top edge 205 of the siding member/upper strip is capped with a spherical bulb 206, or put another way, the top edge has a bulbous tip. This curved surface provided by the bulb aids in allowing the upper strip to slip into the groove 260 when being installed against a wall. The embodiment of FIG. 29 illustrates the siding member as formed by profile extrusion.

FIG. 30 is an enlarged view of the upper area of the composite panel, showing the upper strip 230 and the spherical bulb 206. Also indicated are the nailing wall 224 of the nailing divot, the top face 130, and the rear wall 120 of the backing member, and top wall 250 of the siding member 200. Here, two dotted lines are shown. The horizontal dotted line indicates a plane which is parallel to the rear face 120 of backing member 100. The angled dotted line indicates the plane of the upper strip 230. An angle J is defined between these two dotted lines, and is greater than 0°, and in some embodiments 5° or greater. The angle J is generally less than 45°. This better matches the angle of installation when two panels are joined together.

The thickness of the nailing wall 224 is indicated here with reference numeral 227, and the thickness of the top wall 250 is indicated with reference numeral 251. In some further embodiments, the top wall thickness 251 is greater than the nailing wall thickness 227. For example, the nailing wall may have a thickness of 0.048 inches, while the top wall has a thickness of 0.050 inches. This makes the top of the siding member (and the composite panel) more rigid to reduce bowing due to wind resistance.

As illustrated in FIG. 31, the upper strip 230 of the lower panel 107 acts as a tongue that enters the groove 160 of upper panel 109.

Figure 32:
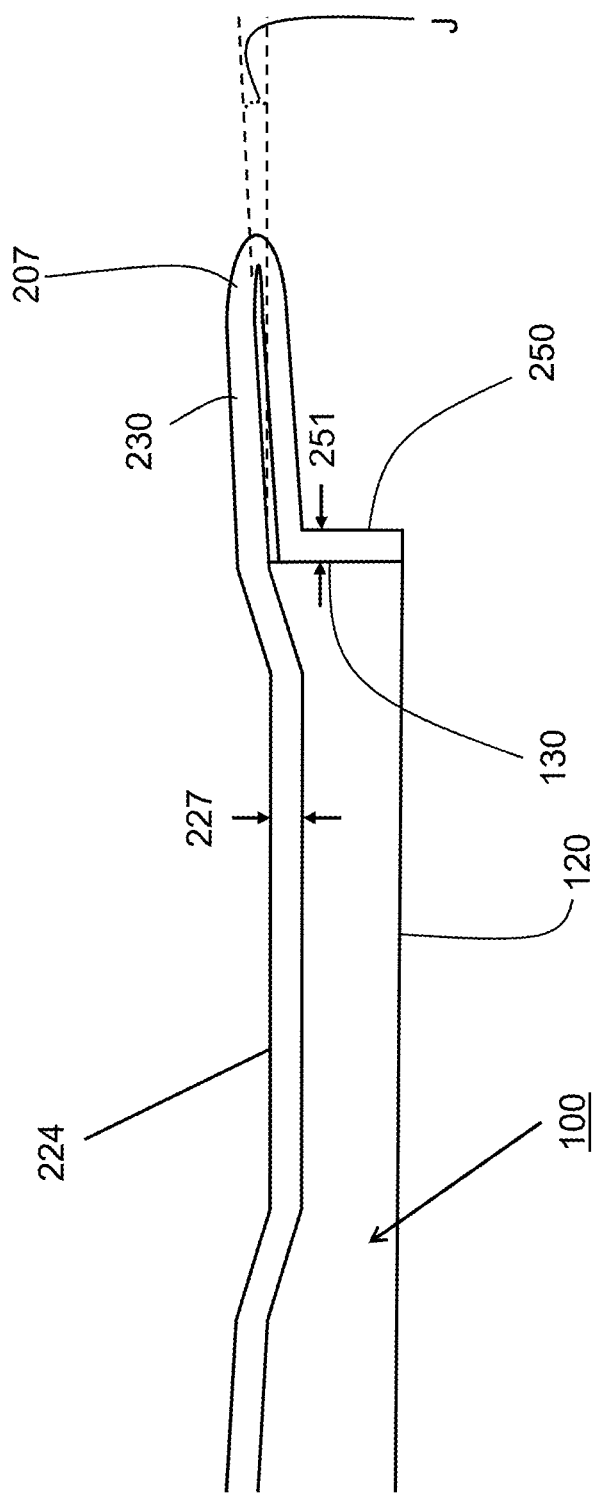
FIG. 32 is an enlarged side view of the upper strip area, showing a curved surface at the top edge of the siding member, formed by bending the siding member over to form a rollover or foldover end. This particular figure shows the siding figure as made by post-extrusion forming processes.

FIG. 32 is similar to FIG. 30, and shows another structure that can provide a curved surface at the top edge 205 of the siding member/upper strip. Instead of a spherical bulb, the material used to form the siding member/upper strip is bent or curved over, to provide the curved surface 207 and the top wall 250. This illustrates the siding member formed by post-forming, where an extruded flat sheet is subsequently bent/folded into the desired shape.

All of the embodiments depicted in the present disclosure are illustrated as single profile products. A profile is the contour or outline of the siding member as viewed from the side. However, the composite siding panels of the present disclosure can have any type of profile, such as single, double, triple, dutch lap, or vertical board and batten, as these terms are recognized in the art. In addition, the profile can be of any size, such as 5-inch, 6-inch, 7-inch, 8-inch, etc.

It may be desirable for the backing member 100 of the various embodiments shown herein to be very thin. In this regard, the top thickness 105 and the bottom thickness 103 indicated in FIG. 2 apply to all of the embodiments shown herein. In some particular embodiments, the bottom thickness 103, which is also the thickest part of all of the depicted composite insulating panels, has a thickness of about 0.5 inches to about 1 inch, or from about 0.5 inches to about 0.8 inches. These measurements are particularly applicable to the embodiments of FIG. 1, FIG. 5, FIG. 8, and FIG. 14, though they can apply to all of the depicted embodiments. However, it should be noted that the thickness of the backing member will be determined by the target R-value and the building application. For example, some backing members may have a bottom thickness of about 3 inches. Thus, the present disclosure is not necessarily limited to these thicknesses for the backing member.

The slope of the face of the composite insulating panel can vary as desired. For example, the slope may be zero for vertical board and batten products. As another example, in some embodiments, the ratio of the top thickness 105 to the bottom thickness 105 is from about 0.25:1 to about 0.75:1. In more particular embodiments, the ratio of the top thickness 105 to the bottom thickness 105 is from about 0.25:1 to about 0.40:1, or is from about 0.6:1 to about 0.75:1. In yet additional embodiments, (A) the ratio of the top thickness 105 to the bottom thickness 105 is from about 0.25:1 to about 0.40:1, and (B) the bottom thickness 105 is from about 0.5 inches to about 1 inch, including from about 0.5 inches to about 0.8 inches.

If desired, the rear face 120 of the backing member 100 may also include a drainage system. It is contemplated that the drainage system could be in the form of drainage grooves formed or fabricated into the rear face 120 of the backing member 100. Such a drainage system is described in U.S. Patent Publication Nos. 2005/0081468 and 2007/0175154, the disclosures of which are hereby fully incorporated by reference.

The backing member provides structural integrity to the composite insulating panel. For example, the backing member is the platform to which the siding member is connected. The backing member may be shaped to provide the desired profile for the overall insulating panel. For example, the shape of the backing member may be obtained by computer numerical control (CNC) cutting. If desired, the rear face of the backing member may include a drainage system, such as drainage grooves, which may be milled or wire-cut. It is noted that the backing member 100 is very thin. The depth of the backing member (from the front face to the rear face) is about three-quarters of an inch (0.75 inches) at its deepest point.

The backing member is generally made from a cellular foam product, i.e. a plastic or polymeric material with numerous cells of trapped air distributed throughout its mass. For example, expanded polystyrene (EPS) is a cellular foam plastic made from beads of polystyrene beads that are first pre-expanded and allowed to rest for a suitable interval, then molded in closed steam-heated shaped molds to produce closed-cell molded foams. The size and density of the closed cells can be controlled and may vary depending upon the application. Suitable materials for the backing member can include extruded polystyrene (XPS), expanded polystyrene (EPS), polyurethane, polyisocyanurate, polyethylene, polypropylene, or combinations thereof. It is also contemplated that the backing member could be made from a rigid foam material. One such material is commercially available as Neopor® from BASF, which is a graphite polystyrene rigid foam material.

Expanded or extruded polystyrene are particularly desirable materials for the backing member because they provide a solid feel; improve the R-value; deaden noise transmitted through the siding; and allow moisture to migrate away from the exterior wall into the external environment, protecting the exterior wall behind the backing member and reducing the risk of mold growth.

The backing member may be shape molded. Such molding operations will generally impart the desired contours and/or design to the backing member. Typically, beads and/or pellets of a polymeric precursor material, such as pre-expanded polystyrene, are placed in a suitably configured die mold, then reacted in the presence of water and heat (i.e. steam) to expand during the reaction process. The polymeric precursor material expands and presses against the die surface to form compressed elongated closed cells that form a characteristic tough smooth skin. The shape molded process produces a panel that is essentially straight and/or free of camber.

The siding member provides environmental resistance and durability. It is contemplated that the siding member is generally contoured to conform to the contours of the backing member and be adhesively attached thereto. Generally, the siding member must be thick enough to resist sagging and retain the desired shape. However, the backing member allows the siding member to be thinner than would otherwise be necessary. The siding member only has to provide weatherability to the insulating panel. In particular, the veneer of the siding member is entirely backed by the backing member (i.e., 100% backed), and is adhered to the backing member. This is advantageous because high pigment content in the veneer can cause distortion upon prolonged exposure to heat (e.g. sunlight). The support of the backing member reduces/eliminates this distortion. This also improves the impact resistance and durability of the siding member. In particular embodiments, the composite insulating panels of the present disclosure can pass ASTM D3679 surface distortion standards when tested at 170° F., especially when the siding member is made of vinyl.

Figure 33:
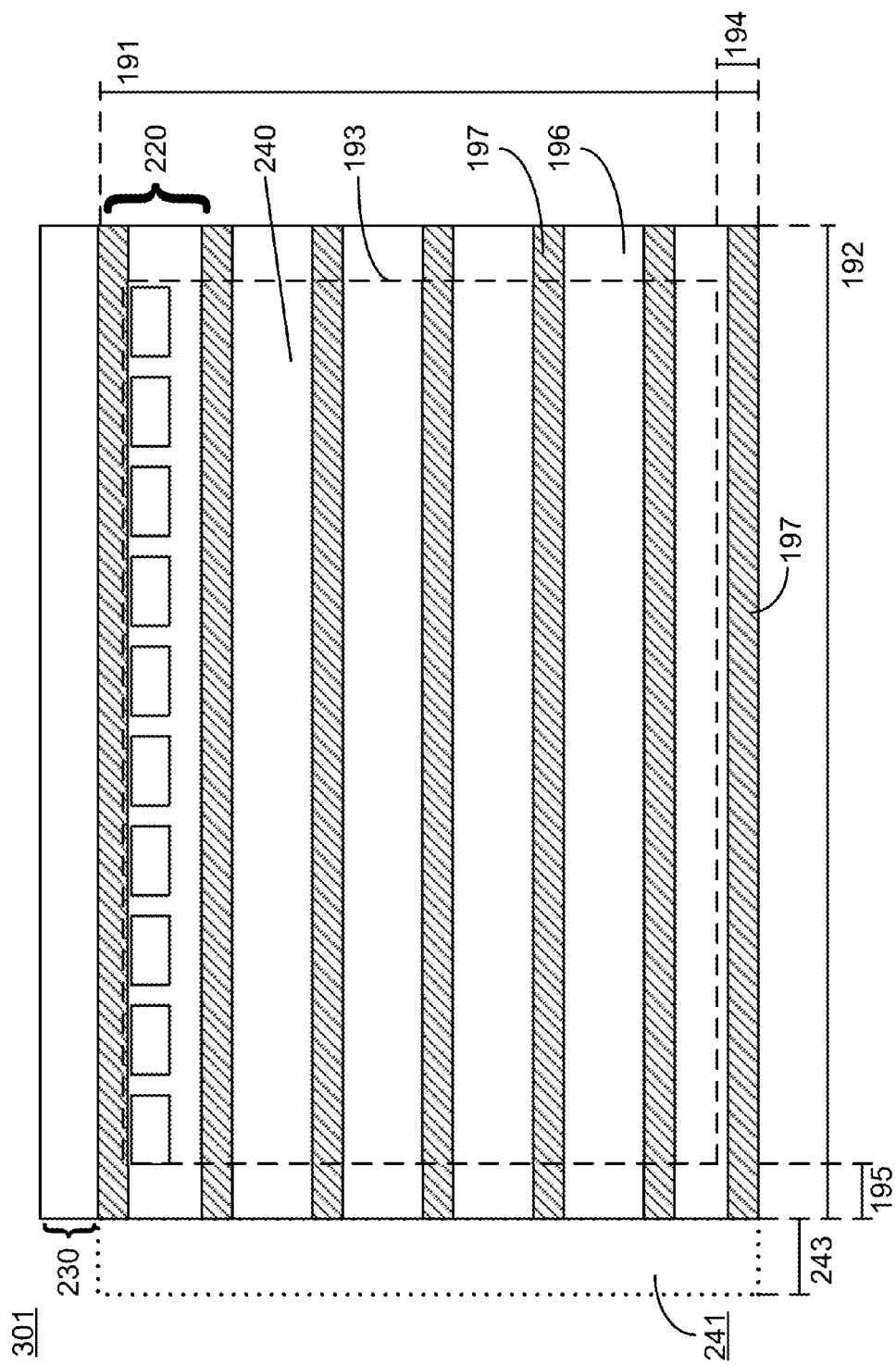
FIG. 33 is a see-through front view of the composite panel of FIG. 8, showing the adhesive pattern and distribution on the front face of the backing member.

In the composite panels of the present disclosure, a substantial portion of a perimeter of the front face of the backing member is bonded to the rear face of the siding member. This is illustrated in FIG. 33, which shows a see-through view of the composite panel 301 of FIG. 8. The upper strip 230, nailing divot 220, and the veneer 240 of the siding member are visible, with the nailing divot and the veneer being see-through. The upper strip 230 extends above the backing member. In some embodiments, the siding member may extend beyond the side of the backing member. This is indicated with reference numeral 241 (surrounded by dotted lines), with this extension having a length 243.

The dimensions of the front face of the backing member are indicated by vertical height 191 and horizontal length 192. The portion of the front face of the backing member which is not considered to be the perimeter of the front face is located within the dotted box 193. The perimeter 196 has a constant width of 0.25 inches, as indicated by vertical reference numeral 194 and horizontal reference numeral 195. The crosshatched rectangles 197 indicate adhesive, which is used to bond the front face of the siding member to the rear face of the backing member. In this embodiment, the rear face of the backing member is made up of the rear of the veneer and the nailing divot. A "substantial portion" of a perimeter of the front face of the backing member is bonded to the rear face of the siding member when at least 60% of the surface area of the perimeter of the front face of the backing member is covered with adhesive. Of course, the rest of the front face can also contain adhesive (as indicated), but this should not be construed as requiring the entirety of the front face of the backing member to be covered with adhesive. The adhesive can be applied in any pattern, for example in the form of beads, ribbons, or swirls, and is illustrated here as rectangles for simplicity. There is thus no adhesive gap along the perimeter of the front face, which differs from conventional composite panels. A "substantial portion" of the front face of the backing member (not just its perimeter) is covered with adhesive when at least 60% of the entire surface area of the front face of the backing member is covered with adhesive. However, the degree of coverage by the adhesive can also be lower, if desired.

The siding member can be formed from any suitable polymeric, metallic, cementitious or composite material. Exemplary materials include vinyl, polypropylene, fiber-cement material, polyolefins, polyvinyls, polycarbonates, polyacetals, polysulfones, polyesters, polyam ides, multi-layer films, polyethylene (HDPE), polypropylene, low density polyethylene (LDPE), CPVC ABS, ethyl-vinyl acetate, various extruded ionomeric films, polyethylene based films, wood, or combinations thereof. Other siding materials suitable for the siding member layer include wood, aluminum, and steel. As discussed above, the siding member can be shaped using different processes, such as profile extrusion or post-forming.

It is noted that the siding member is usually made as one integral component. However, the nailing divot of the siding member can be made from a different material than the other parts of the siding member (e.g. the veneer, upper strip, lip, etc.). For example, if the siding member is formed by extrusion of a single material (e.g. vinyl), the nailing divot may be formed by co-extrusion of two materials. This is intended to reinforce the nailing divot (i.e. improve the strength of the openings/nail slots). For example, vinyl can distort upon exposure to continuous heat, which can permit the fasteners to pull out/pull through more easily. The use of additional/different materials at the nailing divot reinforces the overall composite siding panel.

It is noted that the interlock between composite siding panels is in the foam backing member, not in the vinyl siding member, so the strength and design of the backing member will determine the strength of the lock. This allows for faster and easier installation, and a high wind-load resistance for the composite insulating panel. In addition, the composite siding panels lock together by stacking down upon each other, rather than locking up as with the standard Pittsburgh lock. This increases speed of insulation and provides a more consistent interface between composite panels as well.

The composite insulating panels are used in suitable combinations to be affixed to or attached to exterior walls of a building. They can be used on several types of structures including, but not limited to, wood-frame, cement block, structural insulated panels (SIPS), insulating concrete forms (ICFs), steel studs, etc. When installed, the resulting backing member is uniform and forms a complete seal, so that the insulation has no gaps. Full foam-to-foam contact can be achieved between adjacent panels (whether side-to-side or above-below). This reduces air leakage and thermal breaks in the insulation. This enables the insulated siding system to have less air movement from back (inside) to front (outside), therefore increasing energy efficiency. In addition, any perforations in the wall are sealed off from outside elements by the backing member. The siding member has a nailing divot, which minimizes the overall amount of perforations in the exterior wall. Nails, screws, or staples can be used with equal ease and can be more accurately placed and are more secure because they are applied directly to the exterior wall through the nailing divot in the siding panel, instead of through the flexible backing member.

In particular embodiments, back-to-front air movement through an interlocked system of composite insulating panels is reduced by at least 40%. In more specific embodiments, the back-to-front air movement through an interlocked system of composite insulating panels is reduced by at least 50%, 60%, 70%, 80%, 90%, 93%, 95%, 97%, or 98%. As mentioned above, gaps in the insulating foam backer are reduced/eliminated by the stacking. The tongue-and-groove design is also tight enough to stop air movement through the interlocking section between composite panels. Less foam needs to be removed to accommodate the traditional Pittsburgh lock. As a result, the R-value for a given thickness may be increased, for example, from an R-value of 3.5 to an R-value of 5.0. In other particular embodiments, the system has a windload resistance of at least 60 lbs per square inch when tested according to ASTM D5206 with the backing members having a thickness of 1.25 inches or less. Of course, combinations of these properties can be attained as well.

Other benefits of the insulating panel described herein relate to production. For example, the amount of insulation in the backing member can be increased by simply adding more foam, without any other cost in materials. A single backing member can be used with multiple different veneers to provide desired assemblies.

The present disclosure has been described with reference to exemplary embodiments. Modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A composite insulating panel, comprising:
   a backing member including an upper end, a front face, a substantially flat rear face, a top face having a top front edge, and a bottom face comprising a front section and a rear section, wherein a groove is defined in the bottom face between the front and rear sections; and
   a siding member including an upper end, a lower end including a bottom lip, a veneer with a bottom edge, an upper strip that defines a top edge of the siding member, and a nailing divot located between the veneer and the upper strip;
   wherein at least a substantial portion of the front face of the backing member is bonded to a rear face of the siding member;
   wherein the bottom lip extends rearward from the bottom edge of the veneer and is located adjacent to the front section of the bottom face of the backing member; and
   wherein the siding member further comprises a groove lining that extends from a rearward end of the bottom lip to a bottom edge of the rear face of the backing member, the groove lining abutting the groove; and wherein a tongue is defined in combination by the upper end of the siding member and the upper end of the backing member, the tongue being adapted to engage in another groove of a backing member of an associated adjacent composite insulating panel;

wherein the top edge of the siding member aligns with the top front edge of the backing member; and wherein the top face of the backing member and the rear face of the backing member are not covered by the siding member; and wherein the composite insulating panel can pass ASTM D3679 surface distortion standards when tested at 170° F.

2. The composite insulating panel of claim 1, wherein the front section of the bottom face of the backing member extends downward beyond the rear section of the backing member.

3. The composite insulating panel of claim 1, wherein the groove has a front face, a rear face, and an upper face that connects the front face of the groove to the rear face of the groove, the upper face forming an acute angle with the front face, and the front face and the rear face being generally parallel to each other.

4. The composite insulating panel of claim 1, wherein the nailing divot is formed of at least two layers of different materials.

5. The composite insulating panel of claim 4, wherein the at least two layers of different materials are formed by co-extrusion.

6. The composite insulating panel of claim 1, wherein the groove defined in the bottom face between the front and rear sections consists of front and rear walls which diverge from each other.

7. The composite insulating panel of claim 6, wherein the groove lining consisting consists of a forward face portion extending generally perpendicular to the bottom lip, and a rearward face portion extending at an acute angle in relation to the forward face portion.

8. The composite insulating panel of claim 1, wherein the rear face of the groove forms an acute angle with the rear face of the backing member; and
   wherein the front face of the backing member forms an acute angle with the top face of the backing member.

9. The composite insulating panel of claim 1, wherein the backing member has a first thickness measured as a distance between the rear face of the backing member and the front face of the backing member at the nailing divot, and a second thickness measured as a distance between the rear face of the backing member and the front face of the backing member at a closed end of the groove; and wherein the second thickness is greater than the first thickness.

10. The insulating panel of claim 9, wherein a ratio of the first thickness to the second thickness of the backing member is from about 0.25:1 to about 0.75:1.

11. The composite insulating panel of claim 1, wherein the nailing divot is recessed relative to a front face of the veneer.

12. An insulated siding system comprising a first composite panel and a second composite panel;

wherein the first composite panel and the second composite panel both comprise:
   a backing member including an upper end, a front face, a substantially flat rear face, a top face having a top front edge, and a bottom face comprising a front section and a rear section, wherein the front face is angled with respect to the rear face, and wherein a groove is defined in the bottom face between the front and rear sections; and
   a siding member including an upper end, a lower end including a bottom lip, a veneer with a bottom edge, an upper strip that defines a top edge of the siding member, and a nailing divot located between the veneer and the upper strip;
wherein at least a substantial portion of the front face of the backing member is bonded to a rear face of the siding member;
wherein the bottom lip extends rearward from the bottom edge of the veneer of the siding member and is located adjacent to the front section of the bottom face of the backing member; and
wherein the siding member further comprises a groove lining that extends from a rearward end of the bottom lip to a bottom edge of the rear face of the backing member, the groove lining abutting the groove; and
wherein a tongue is defined in combination by the upper end of the siding member and the upper end of the backing member, and wherein the top edge of the siding member aligns with the top front edge of the backing member;
wherein the top edge of the siding member aligns with the top front edge of the backing member; and
wherein the top face of the backing member and the rear face of the backing member are not covered by the siding member;
wherein the tongue of the first composite panel engages the groove of the second composite panel;
wherein the system has a windload resistance of at least 60 lbs per square inch when tested according to ASTM D5206 with the backing members having a thickness of 1.25 inches or less.

* * * * *